United States Patent
Ogawa et al.

(10) Patent No.: US 11,039,095 B2
(45) Date of Patent: Jun. 15, 2021

(54) IMAGE PICKUP APPARATUS, SOLID-STATE IMAGE PICKUP DEVICE, AND CONTROL METHOD FOR IMAGE PICKUP APPARATUS

(71) Applicant: SONY CORPORATION, Tokyo (JP)

(72) Inventors: Koji Ogawa, Kanagawa (JP); Masaki Sakakibara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 177 days.

(21) Appl. No.: 16/303,796

(22) PCT Filed: Apr. 12, 2017

(86) PCT No.: PCT/JP2017/014953
§ 371 (c)(1),
(2) Date: Nov. 21, 2018

(87) PCT Pub. No.: WO2017/208638
PCT Pub. Date: Dec. 7, 2017

(65) Prior Publication Data
US 2020/0322555 A1    Oct. 8, 2020

(30) Foreign Application Priority Data
May 30, 2016    (JP) .............................. JP2016-107260

(51) Int. Cl.
*H04N 5/3745*    (2011.01)
*H04N 5/355*    (2011.01)
*H04N 5/235*    (2006.01)

(52) U.S. Cl.
CPC ....... *H04N 5/35581* (2013.01); *H04N 5/2351* (2013.01); *H04N 5/37455* (2013.01)

(58) Field of Classification Search
None
See application file for complete search history.

(56) References Cited

U.S. PATENT DOCUMENTS

2007/0047807 A1* 3/2007 Okada .................. H04N 5/2351
                                                       382/169
2008/0001065 A1* 1/2008 Ackland .............. H04N 5/3559
                                                       250/208.1
(Continued)

FOREIGN PATENT DOCUMENTS

JP    2009-088927    4/2009
JP    2009-296179    12/2009
(Continued)

OTHER PUBLICATIONS

International Search Report prepared by the Japan Patent Office dated Jun. 1, 2017, for International Application No. PCT/JP2017/014953.

(Continued)

*Primary Examiner* — Twyler L Haskins
*Assistant Examiner* — Wesley J Chiu
(74) *Attorney, Agent, or Firm* — Sheridan Ross P.C.

(57) ABSTRACT

Decrease of the frame rate is suppressed in a solid-state image pickup device that generates a frame having an increased dynamic range. A measurement section measures a reception light amount in each of a plurality of regions to generate a measurement result. A selection section selects one of a plurality of exposure periods different from each other based on the measurement result in each of the plurality of regions. An image data generation section performs exposure for each of the plurality of regions over the selected exposure period to generate image data. An image processing section adjusts a value of the image data generated for each of the plurality of regions based on the measurement result.

10 Claims, 28 Drawing Sheets

(56) References Cited

U.S. PATENT DOCUMENTS

| | | | |
|---|---|---|---|
| 2011/0013064 A1* | 1/2011 | Lahav | H04N 5/335 |
| | | | 348/296 |
| 2014/0125972 A1 | 5/2014 | Namba et al. | |
| 2014/0287884 A1 | 9/2014 | Shen et al. | |
| 2015/0244916 A1* | 8/2015 | Kang | H04N 5/2355 |
| | | | 348/222.1 |
| 2016/0269659 A1 | 9/2016 | Ikeda et al. | |
| 2018/0239108 A1* | 8/2018 | Ishii | H04N 5/3696 |

FOREIGN PATENT DOCUMENTS

| | | |
|---|---|---|
| JP | 2014-093754 | 11/2012 |
| WO | WO 2015/060143 | 4/2015 |

OTHER PUBLICATIONS

Official Action (with English translation) for Chinese Patent Application No, 201780028797, dated Sep, 1, 2020, 16 pages.

\* cited by examiner

FIG.5

| VCO | STATE OF DECISION FLAG RETENTION SECTION |
|---|---|
| 0 | HOLD STATE |
| 1 | THROUGH STATE |

FIG.6

| CNT | OPERATION OF DECISION FLAG GENERATION SECTION |
|---|---|
| CNT > SET VALUE | LATCH INPUT SIGNAL LIN ← 1 |
| CNT ≦ SET VALUE | LATCH INPUT SIGNAL LIN ← 0 | a b c

IMAGE PICKUP APPARATUS, SOLID-STATE IMAGE PICKUP DEVICE, AND CONTROL METHOD FOR IMAGE PICKUP APPARATUS

CROSS REFERENCE TO RELATED APPLICATIONS

This application is a national stage application under 35 U.S.C. 371 and claims the benefit of PCT Application No. PCT/JP2017/014953 having an international filing date of 12 Apr. 2017, which designated the United States, which PCT application claimed the benefit of Japanese Patent Application No. 2016-107260 filed 30 May 2016, the entire disclosures of each of which are incorporated herein by reference.

TECHNICAL FIELD

The present technology relates to an image pickup apparatus, a solid-state image pickup device and a control method for an image pickup apparatus. Particularly, the present technology relates to an image pickup apparatus, a solid-state image pickup device and a control method for an image pickup apparatus by which image data having an expanded dynamic range is produced.

BACKGROUND ART

In the past, in an image pickup apparatus, a solid-state image pickup device for picking up image data has been used. The dynamic range that is a ratio between a maximum value and a minimum value of the amount of light that can be photoelectrically converted by single time exposure by the solid-state image pickup device is generally narrow in comparison with the ratio between a maximum value and a minimum value of the amount of natural light. Where the dynamic range is narrow in this manner, overexposure or underexposure sometimes occurs and gives rise to white jump or blackout in image data, resulting in deterioration of picture quality. In order to suppress such deterioration of the picture quality, an image pickup apparatus has been proposed which performs exposure by a plural number of times for different exposure periods to generate a plurality of image data and synthesizes the image data to generate image data of a dynamic range greater than that before the synthesis (for example, refer to PTL 1).

CITATION LIST

Patent Literature

[PTL 1]
  JP 2009-88927A

SUMMARY

Technical Problem

With the related art described above, since the dynamic range is expanded, deterioration of the picture quality by overexposure or underexposure can be suppressed. However, according to the configuration, since a plurality of image data having different exposure periods must be picked up every time synthesis is performed, there is a problem that the frame rate of synthesized frames decreases in comparison with that in an alternative case in which such synthesis is not performed. For example, in the case where a frame is picked up at a frame rate of 60 Hertz (Hz) and two frames are synthesized to generate a synthesized frame of an increased dynamic range, the frame rate of the synthesized frame decreases to 30 Hertz (Hz).

The present technology has been created taking such a situation as described above into consideration, and it is an object of the present technology to suppress decrease of the frame rate in a solid-state image pickup device that generates a frame having an increased dynamic range.

Solution to Problem

The present technology has been made to eliminate the problem described above and, according to a first aspect of the present technology, there are provided an image pickup apparatus including a measurement section configured to measure a reception light amount in each of a plurality of regions to generate a measurement result, a selection section configured to select one of a plurality of exposure periods different from each other based on the measurement result in each of the plurality of regions, a digital signal generation section configured to perform exposure for each of the plurality of regions over the selected exposure period to generate a digital signal, and an image processing section configured to adjust a value of the digital signal generated for each of the plurality of regions based on the measurement result, and a control method for the image pickup apparatus. By this, an action is brought about that, in each of the plurality of regions, an exposure period is selected in response to a result of measurement of the reception light amount, and the value of the digital signal is adjusted on the basis of the result of measurement.

Further, in this first aspect, each of the plurality of regions may be configured from one pixel. By this, an action is brought about that an exposure period is selected in response to the result of measurement of the reception light amount in each of the plurality of pixels.

Further, in this first aspect, each of the plurality of regions may be configured from a plurality of pixels. By this, an action is brought about that an exposure period is selected in response to the result of measurement of the reception light amount in each of the regions each configured from the plurality of pixels.

Further, in this first aspect, the measurement section may decide whether or not the reception light amount is higher than a given value and generate and retain a decision flag indicative of a result of the decision as the measurement result. By this, an action is brought about that it is decided whether or not the reception light amount is higher than the given value.

Further, in this first aspect, the image pickup apparatus may further include a counting section configured to count a count value in synchronism with a given clock signal, a photodiode configured to generate charge according to the reception light amount, and a comparator configured to compare a given ramp signal and a voltage according to an amount of the charge with each other and output a result of the comparison as a comparator output signal. The digital signal generation section retains, in the case where the comparator output signal is inverted, the count value as the digital signal, and the measurement section includes a decision flag generation section configured to compare the count value and a given set value according to the given value with each other and output a result of the comparison as a latch input signal, and a decision flag retention section configured to retain, when the comparator output signal is inverted, a value of the latch input signal as the decision flag. By this, an action is brought about that, in the case where the comparator output signal is inverted, the count value is retained as a digital signal.

Further, in this first aspect, the counting section first may perform one of an incrementing process and a decrementing process of the count value and then perform the other of the processes. By this, an action is brought about that, after one of the incrementing process and the decrementing process of the count value is performed, the other of the processes is performed.

Further, in this first aspect, the image processing section may execute at least one of a process of amplifying the digital signal in any region in which the reception light amount is higher than the given value from among the plurality of regions and another process of attenuating the digital signal in any region in which the reception light amount does not exceed the given value from among the plurality of regions. By this, an action is brought about that the digital signal is amplified or attenuated.

Further, in this first aspect, the measurement section may retain the measurement result every time a given image pickup cycle elapses, and the selection section may select, in each of the given image pickup cycles, one of the plurality of exposure periods based on the measurement result retained before the image pickup cycle. By this, an action is brought about that, in each image pickup cycle, an exposure period is selected on the basis of the result of measurement retained before the image pickup cycle.

Further, in this first aspect, the selection section may select, in each of the given image pickup cycles, one of the plurality of exposure periods based on the measurement result generated in the image pickup cycle. By this, an action is brought about that, in each image pickup cycle, an exposure period is selected on the basis of the result of measurement generated in the image pickup cycle.

Further, in this first aspect, the measurement section, the selection section and the digital signal generation section may be provided in a solid-state image pickup device, and a circuit in the solid-state image pickup device may be distributed to a plurality of stacked semiconductor substrates. By this, an action is brought about that a digital signal is generated by the circuit in the solid-state image pickup device provided on the plurality of stacked semiconductor substrates.

Meanwhile, according to a second aspect of the present technology, there is provided a solid-state image pickup device including a measurement section configured to measure a reception light amount in each of a plurality of regions to generate a measurement result, a selection section configured to select one of a plurality of exposure periods different from each other based on the measurement result in each of the plurality of regions, and a digital signal generation section configured to perform exposure for each of the plurality of regions over the selected exposure period to generate a digital signal indicative of an exposure light amount. By this, an action is brought about that, in each of the plurality of regions, an exposure period is selected in response to a result of measurement of the reception light amount.

Advantageous Effect of Invention

According to the present technology, a superior effect that decrease of the frame rate is suppressed in a solid-state image pickup device that generates a frame having an expanded dynamic range. It is to be noted that the effect described here is not necessarily restrictive and may be some effects described in the present disclosure.

BRIEF DESCRIPTION OF DRAWINGS

FIG. 5 is a view depicting an example of operation of a decision flag retention section in the first embodiment of the present technology.

FIG. 6 is a view depicting an example of operation of a decision flag generation section in the first embodiment of the present technology.

DESCRIPTION OF EMBODIMENTS

In the following, modes for carrying out the present technology (hereinafter referred to as embodiments) are described. It is to be noted that the description is given in the following order.
1. First Embodiment (example in which an exposure period is selected for each pixel in response to a reception light amount)
2. Second Embodiment (example in which an exposure period is selected for each pixel in response to a reception light amount and a digital signal is generated by an up-down counter)
3. Third Embodiment (example in which an exposure period is selected for each light reception region in response to a reception light amount)
4. Fourth Embodiment (example in which an exposure period is selected for each pixel in response to a reception light amount in a solid-state image pickup device of the stacked type)
5. Fifth Embodiment (example in which an exposure period is selected for each pixel in response to a reception light amount measured in an image pickup cycle)

1. First Embodiment

Figure 1:
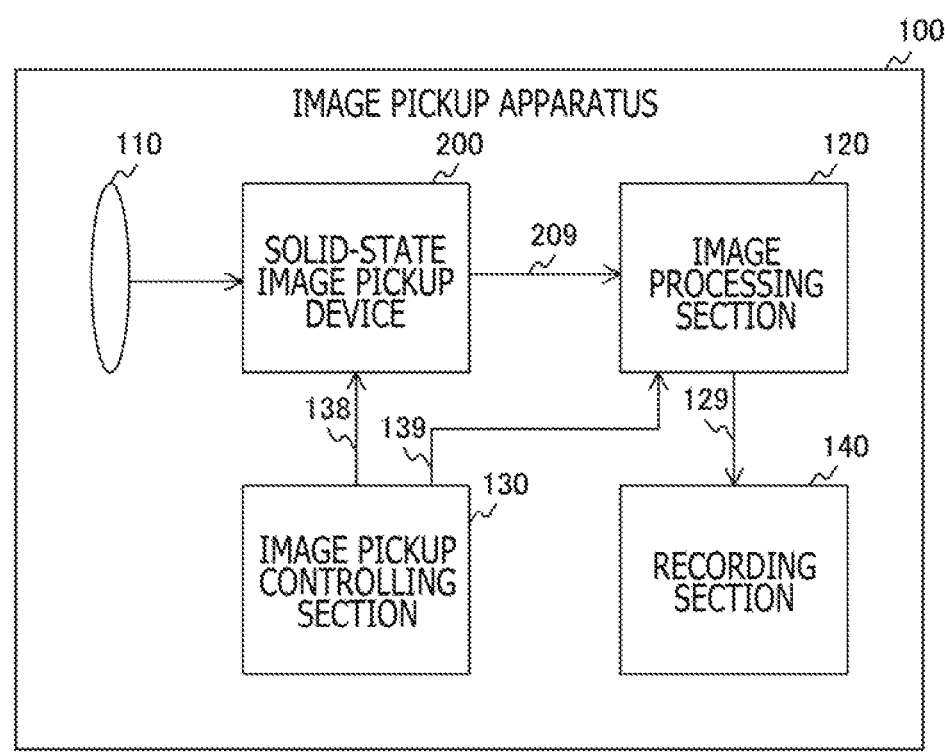
FIG. 1 is a block diagram depicting an example of a configuration of an image pickup apparatus in a first embodiment of the present technology.

[Example of Configuration of Image Pickup Apparatus]
FIG. 1 is a block diagram depicting an example of a configuration of an image pickup apparatus 100 in the first embodiment. The image pickup apparatus 100 is an apparatus that picks up image data and includes an image pickup lens 110, a solid-state image pickup device 200, an image processing section 120, an image pickup controlling section 130 and a recording section 140. As the image pickup apparatus 100, for example, a digital camera, a smartphone or an information processing apparatus that has an image pickup function and so forth are assumed.

The image pickup lens 110 condenses and introduces light to the solid-state image pickup device 200. The solid-state image pickup device 200 generates image data under the control of the image pickup controlling section 130. The solid-state image pickup device 200 supplies the generated image data to the image processing section 120 through a signal line 209.

The image processing section 120 executes various kinds of image processing for image data under the control of the image pickup controlling section 130. The image processing includes a high dynamic range synthesis process for expanding the dynamic range of image data from that before the processing. The image processing section 120 supplies the image data after the image processing to the recording section 140 through a signal line 129. The recording section 140 records the image data.

The image pickup controlling section 130 controls the entire image pickup apparatus 100. The image pickup controlling section 130 supplies a vertical synchronizing signal indicative of an image pickup timing and so forth to the solid-state image pickup device 200 through a signal line 138. Further, the image pickup controlling section 130 supplies a signal indicative of a timing at which image processing is to be performed to the image processing section 120 through a signal line 139.

It is to be noted that, although the image pickup lens 110, the solid-state image pickup device 200, the image processing section 120, the image pickup controlling section 130 and the recording section 140 are disposed in a same apparatus, also it is possible to distribute them in a plurality of apparatus. For example, the image pickup lens 110 may be disposed in a lens unit while the solid-state image pickup device 200 and so forth are disposed in the image pickup apparatus 100 and the image processing section 120 and so forth are disposed in an information processing apparatus.

Further, while the image processing section 120 is provided outside the solid-state image pickup device 200, the configuration of them is not limited to this, and the image processing section 120 may be provided inside the solid-state image pickup device 200.

Figure 2:
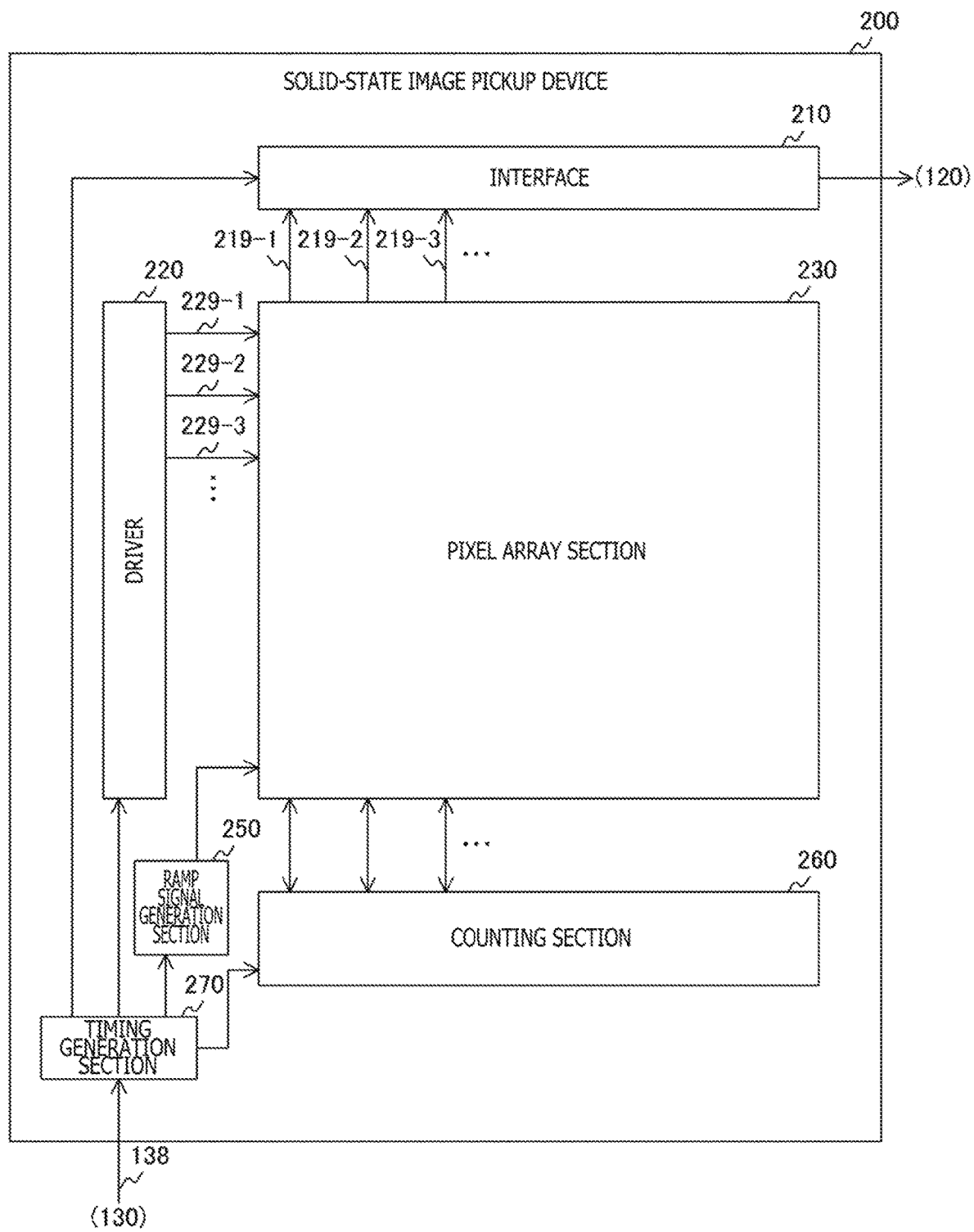
FIG. 2 is a block diagram depicting an example of a configuration of a solid-state image pickup device in the first embodiment of the present technology.

[Example of Configuration of Solid-State Image Pickup Device]
FIG. 2 is a block diagram depicting an example of a configuration of the solid-state image pickup device 200 in the first embodiment. The solid-state image pickup device 200 includes an interface 210, a driver 220, a pixel array section 230, a ramp signal generation section 250, a counting section 260 and a timing generation section 270. The circuits in the solid-state image pickup device 200 are provided, for example, on a single semiconductor substrate.

The timing generation section 270 generates timing signals indicating timings for operation for the interface 210, the driver 220, the ramp signal generation section 250 and the counting section 260. The timing generation section 270 supplies the generated timing signals to the blocks corresponding to the signals.

The counting section 260 counts a count value in synchronism with a predetermined clock signal. The ramp signal generation section 250 generates a ramp signal of a sawtooth wave shape. The ramp signal generation section 250 supplies the generated ramp signal to the pixel array section 230.

In the pixel array section 230, a plurality of pixel circuits are arrayed in a two-dimensional lattice. In the following description, a set of pixel circuits arrayed in a predetermined direction (horizontal direction or the like) is referred to as "row," and a set of pixel circuits arrayed in a perpendicular direction to the row is referred to as "column." Each of the pixel circuits generates pixel data using the ramp signal and the count value of the counting section 260 and outputs the pixel data. Here, each of such pixel data includes a digital signal indicative of an exposure light amount of the pixel and a decision flag indicative of whether or not the reception light amount of the pixel exceeds a predetermined value.

The driver 220 drives the pixel circuits to individually output pixel data. The interface 210 reads out the pixel data from each of the pixel circuits. The interface 210 supplies image data, in which the pixel data are arrayed in a two-dimensional lattice, to the image processing section 120.

[Example of Configuration of Pixel Array Section]

Figure 3:
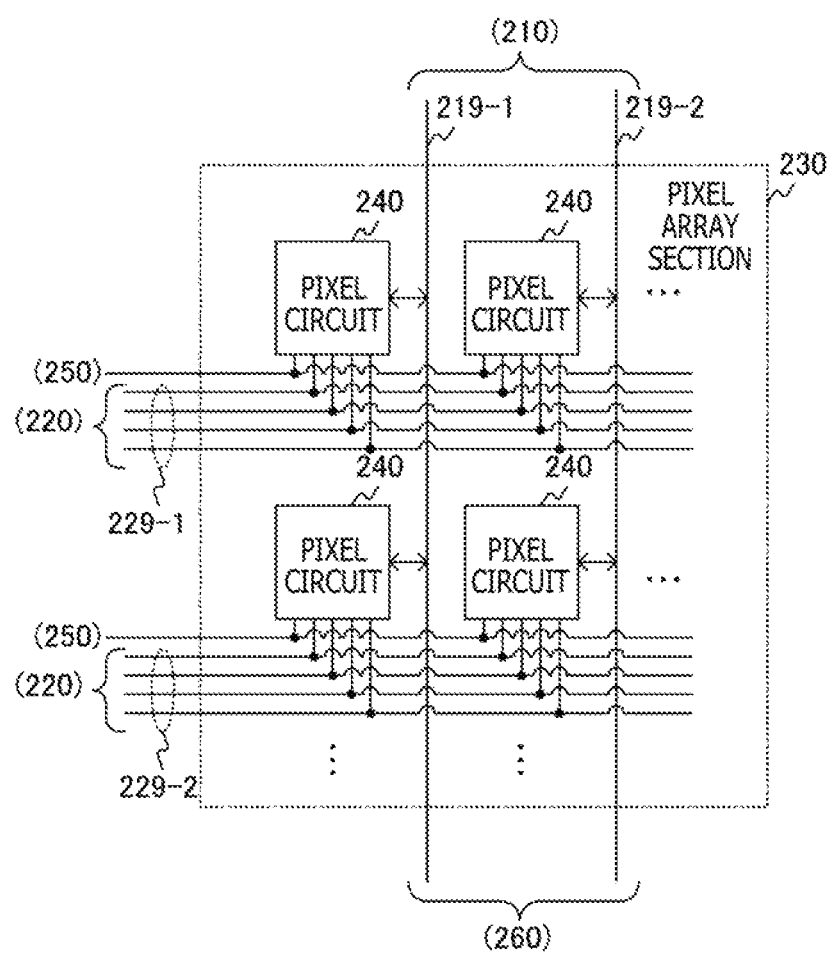
FIG. 3 is a block diagram depicting an example of a pixel array section in the first embodiment of the present technology.

FIG. 3 is a block diagram depicting an example of a configuration of the pixel array section 230 in the first embodiment. In the pixel array section 230, pixel circuits 240 are arrayed in a two-dimensional lattice. Further, in the pixel array section 230, five horizontal signal lines are wired for each row along a row direction and one vertical signal line is wired for each column along a column direction. Each pixel circuit 240 is connected to the driver 220 through four horizontal signal lines from among the five horizontal signal lines and is connected to the ramp signal generation section 250 through the remaining one horizontal signal line. Further, the pixel circuit 240 is connected to the interface 210 and the counting section 260 through the vertical signal line.

[Example of Configuration of Pixel Circuit and Counting Section]

Figure 4:
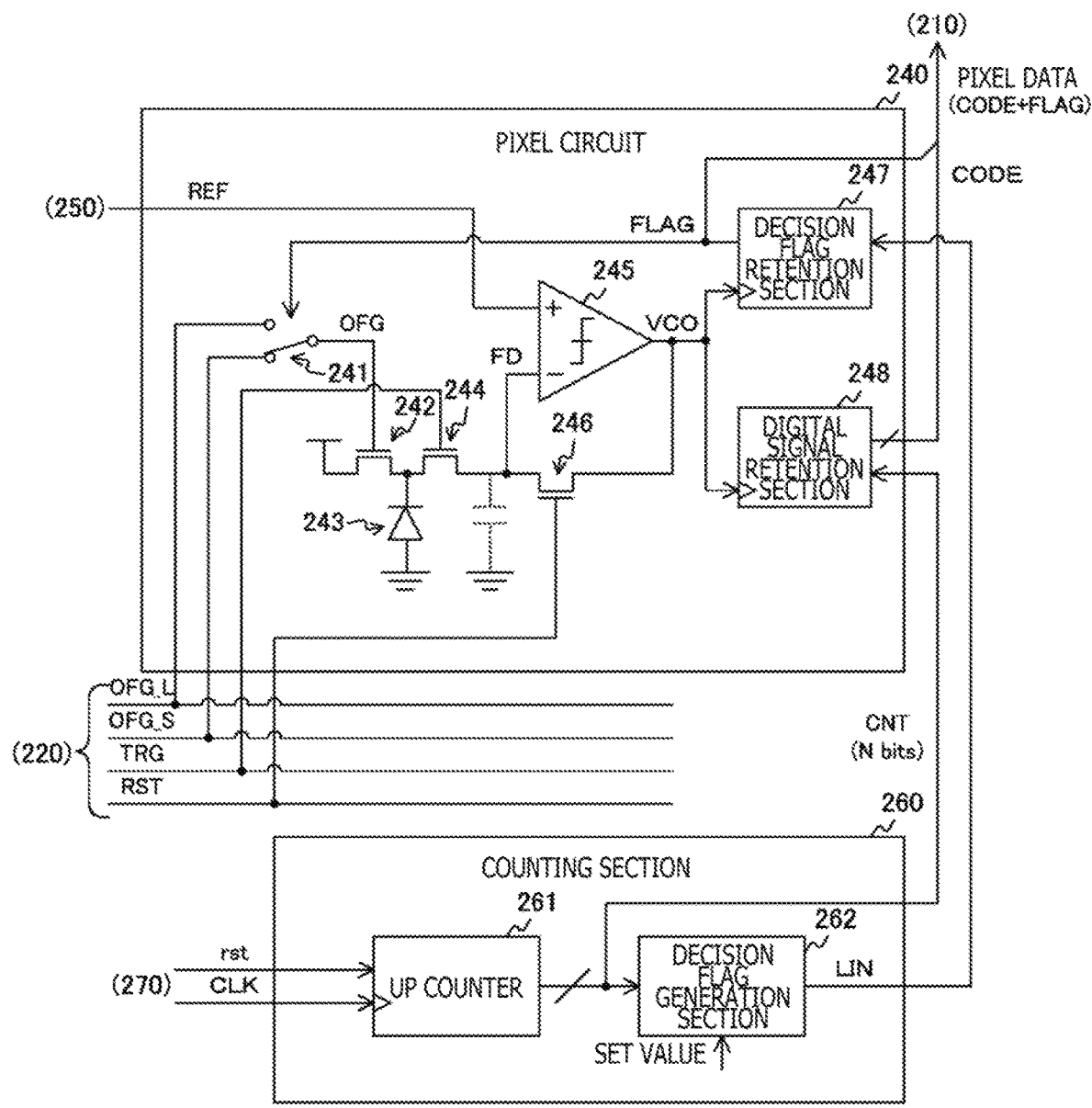
FIG. 4 is a circuit diagram depicting an example of a configuration of a pixel circuit and a counting section in the first embodiment of the present technology.

FIG. 4 is a circuit diagram depicting an example of a configuration of the pixel circuit 240 and the counting section 260 in the first embodiment. The pixel circuit 240 includes a switch 241, a PD (Photo Diode) reset transistor 242, a photodiode 243, a transfer transistor 244, a comparator 245 and an FD reset transistor 246. The pixel circuit 240 further includes a decision flag retention section 247 and a digital signal retention section 248. The counting section 260 includes an up counter 261 and a decision flag generation section 262 for each column of the pixel circuit 240. In FIG. 4, a capacitor of broken lines indicates a floating diffusion layer. Further, for the PD reset transistor 242, the photodiode 243, the transfer transistor 244 and the FD reset transistor 246, for example, an N-type MOS (Metal Oxide Semiconductor) transistor is used.

The switch 241 selects one of control signals OFG (Over Flow Gate)_L and OFG_S in response to the value of a decision flag FLAG retained in the decision flag retention section 247. The switch 241 is implemented by an OR (OR) circuit or the like. The switch 241 supplies the selected signal as a control signal OFG to the gate of the PD reset transistor 242.

Here, the control signals OFG_L and OFG_S are signals for controlling the PD reset transistor 242 that functions as an overflow gate and is generated by the driver 220. It is assumed that the pulse width of the control signal OFG_L is greater than that of the control signal OFG_S. If the switch 241 selects the control signal OFG_S having a great pulse width, then the timing to start exposure can be delayed from that in the case where the control signal OFG_L is selected to reduce the exposure period. It is to be noted that the switch 241 is an example of a selection section described in the claim.

The PD reset transistor 242 discharges charge of the photodiode 243 to a power supply to initialize the photodiode 243. The PD reset transistor 242 is interposed between the photodiode 243 and the power supply. The photodiode 243 photoelectrically converts incidence light to generate charge.

The transfer transistor 244 transfers the charge generated by the photodiode 243 to the floating diffusion layer in accordance with a transfer signal TRG from the driver 220. This transfer signal TRG is a signal for the instruction to transfer charge. The transferred charge is accumulated into the floating diffusion layer, and a voltage according to the charge amount is inputted to the negated input terminal (−) of the comparator 245.

The comparator 245 compares an input voltage FD that is a voltage of the floating diffusion layer and a reference voltage REF that is a signal of the ramp signal. To the non-negated input terminal (+) of the comparator 245, the ramp signal from the ramp signal generation section 250 is inputted. The comparator 245 outputs a result of the comparison as a comparator output signal VCO to the decision flag retention section 247 and the digital signal retention section 248. In the case where the input voltage FD is equal to or lower than the reference voltage REF, the comparator output signal VCO of the high level is outputted, but in the case where the input voltage FD is higher than the reference voltage REF, the comparator output signal VCO of the low level is outputted.

The FD (Floating Diffusion) reset transistor 246 initializes the charge amount of the floating diffusion layer in accordance with a reset signal RST from the driver 220. This reset signal RST is a signal for the instruction to initialize the floating diffusion layer. The FD reset transistor 246 is interposed between the negated input terminal (−) and the output terminal of the comparator 245.

The up counter 261 increments the count value in synchronism with a clock signal CLK from the timing generation section 270. It is assumed that the frequency of this clock signal CLK is higher than that of the vertical synchronizing signal. The up counter 261 supplies a count value CNT of N (N is an integer equal to or higher than 1) bits to the decision flag generation section 262 and the digital signal retention section 248. Further, the up counter 261 initializes the count value CNT in accordance with the reset signal rst from the timing generation section 270. It is to be noted that a down counter may be provided in place of the up counter 261.

The decision flag generation section 262 compares the count value CNT and a predetermined set value and generates a signal indicative of a result of the comparison as a latch input signal LIN. To this latch input signal LIN, for example, the value of "0" is set in the case where the count value CNT is equal to or lower than the set value, but the value of "1" is set in the case where the count value CNT is higher than the set value. Further, to the set value, for example, a value when the floating diffusion layer is saturated is set.

The decision flag retention section 247 retains, in the case where the comparator output signal VCO is inverted from the high level to the low level (namely, in the case where the input voltage FD is higher than the reference voltage REF), the value of the latch input signal LIN as the decision flag FLAG. The decision flag retention section 247 is implemented, for example, by a latch circuit. In the case where the comparator output signal VCO indicates the high level, the decision flag retention section 247 transits to a through state and outputs the value of the latch input signal LIN as it is.

On the other hand, in the case where the comparator output signal VCO is inverted from the high level to the low level, the decision flag retention section 247 transits to a hold state and retains the value of the latch input signal LIN upon inversion as a decision flag FLAG. The decision flag retention section 247 outputs the retained decision flag FLAG to the switch 241 and the interface 210.

The digital signal retention section 248 retains, in the case where the comparator output signal VCO is inverted from the high level to the low level (namely, in the case where the input voltage FD is higher than the reference voltage REF), the count value CNT as a digital signal CODE. The value of this digital signal CODE indicates the exposure light amount of the pixel circuit 240.

Further, the digital signal retention section 248 is implemented, for example, by a latch circuit. In the case where the comparator output signal VCO indicates the high level, the digital signal retention section 248 transits to a through state and outputs the count value CNT as it is.

On the other hand, in the case where the comparator output signal VCO is inverted from the high level to the low level, the digital signal retention section 248 transits to a hold state and retains the count value CNT upon inversion as the digital signal CODE. The digital signal retention section 248 outputs the retained digital signal CODE to the interface 210. It is to be noted that the digital signal retention section 248 is an example of a digital signal generation section described in the claim.

Further, data including the decision flag FLAG from the decision flag retention section 247 and the digital signal CODE from the digital signal retention section 248 is outputted as pixel data of the pixel circuit 240 to the interface 210.

By the configuration described above, if the input voltage FD according to the reception light amount exceeds a saturation level of the floating diffusion layer, then the latch input signal LIN of the high level from the decision flag generation section 262 is retained as a decision flag FLAG into the decision flag retention section 247. In particular, the decision flag FLAG indicates a result of measurement regarding whether or not the reception light amount of the pixel circuit 240 exceeds a predetermined value (saturation level or the like). It is to be noted that the decision flag generation section 262 and the decision flag retention section 247 are an example of a measurement section described in the claim.

Then, the decision flag FLAG retained in a certain frame is read out at a next frame by the switch 241, and the exposure period is switched in response to the decision flag FLAG. Since, in the first frame, the decision flag FLAG remains the initial value, also the exposure period remains its initial value. However, in the second and succeeding frames, exposure for a long period of time and exposure for a short period of time are switched in response to a decision result (FLAG) of the reception light amount in the preceding frame for each pixel circuit 240. In the case where the decision flag FLAG is "0" (namely, in the case where the reception light amount is great exceeding a predetermined value), the exposure for a short period of time is selected. On the other hand, in the case where the decision flag FLAG is "1" (namely, in the case where the reception light amount is equal to or smaller than the predetermined value), the exposure for a long period of time is selected.

By deciding for each pixel whether or not the reception light amount exceeds the predetermined value to switch the exposure period in this manner, the solid-state image pickup device 200 can generate pixel data exposed for a short period of time and pixel data exposed for a long period of time every time a fixed image pickup cycle elapses.

Then, the image processing section 120 can generate image data having an expanded dynamic range in every image pickup cycle by adjusting (amplifying or attenuating), in response to the decision flag FLAG, the pixel value of corresponding pixel data. In the following description, an image whose dynamic range has a predetermined value is referred to as "ordinary image," and an image having a dynamic range expanded to a value higher than the predetermined value is referred to as "HDR (High Dynamic Range) image."

It is to be noted that, although the switch 241 switches the exposure period between two exposure periods having different lengths, it may switch the exposure period among three or more exposure periods having different lengths from one another. In the case where the exposure period is to be switched among M (M is an integer equal to or greater than 3) different exposure periods, the switch 241 is switched by M control signals having pulse widths different from one another. Further, the decision flag generation section 262 generates a switching signal whose value changes to M stages in response to increase of the count value CNT in place of the decision flag FLAG. Further, when the comparator output signal is inverted, the decision flag retention section 247 retains and supplies the switching signal to the switch 241.

Further, although the solid-state image pickup device 200 measures the reception light amount for each pixel to generate a decision flag, the region of a measurement unit of the reception light amount is not limited to a pixel. As hereinafter described, the solid-state image pickup device 200 may measure the reception light amount for each region configured from a plurality of pixels.

FIG. 5 is a view depicting an example of operation of the decision flag retention section 247 in the first embodiment. In the case where the comparator output signal VCO has the low level (namely, in the case where the input voltage FD is higher than the reference voltage REF), the decision flag retention section 247 transits to a hold state and retains the value of the latch input signal LIN as the decision flag FLAG. On the other hand, in the case where the comparator output signal VCO has the high level, the decision flag retention section 247 transits to a through state and outputs the latch input signal LIN as it is. It is to be noted that operation of the digital signal retention section 248 is similar to that of the decision flag retention section 247 except that the number of bits to be retained is different.

FIG. 6 is a view depicting an example of operation of the decision flag generation section 262 in the first embodiment. In the case where the count value CNT is higher than a set value (namely, in the case where the reception light amount is greater than a saturation level), the decision flag generation section 262 sets "1" to the latch input signal LIN. On the other hand, in the case where the count value CNT is equal to or lower than the set value, the decision flag generation section 262 sets "0" to the latch input signal LIN.

Figure 7:
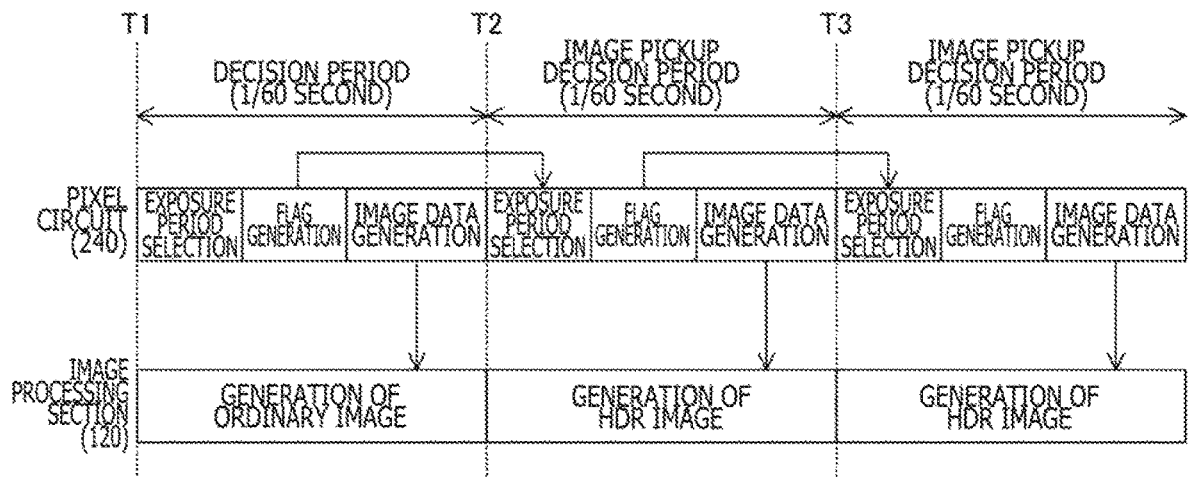
FIG. 7 is a timing chart depicting an example of operation of the solid-state image pickup device in the first embodiment of the present technology.

FIG. 7 is a timing chart depicting an example of operation of the solid-state image pickup device 200 in the first embodiment. It is assumed that, at timing T1, image pickup of image data is started in synchronism with a vertical synchronizing signal VSYNC of 60 Hertz (Hz).

At first timing T1, the decision flag FLAG remains an initial value (for example, "0") in all pixels. Therefore, all pixel circuits 240 perform exposure for an exposure period of an equal length to generate pixel data. Further, each of the pixel circuits 240 decides whether or not the reception light amount exceeds the predetermined value to generate and retain a decision flag FLAG. Then, the image processing section 120 generates a normal image.

When timing T2 after 1/60 second from timing T1 elapses, each of the pixel circuits 240 selects an exposure period in response to the decision flag FLAG in the preceding cycle and performs exposure for the exposure period to generate pixel data. Further, each of the pixel circuits 240 generates a decision flag FLAG. Then, the image processing section 120 refers to the decision flags FLAG to generate an HDR image from two kinds of pixel data having different exposure periods.

After timing T1 till timing T2 described above, from between the decision process regarding whether or not the reception light amount exceeds the predetermined value and the image pickup process of an HDR image, only the decision process is executed. Therefore, this period is hereinafter referred to as "decision period." Further, after timing T2, both the decision process and the image pickup process of an HDR image are performed in every image pickup cycle. Therefore, this period is hereinafter referred to as "image pickup decision period."

It is to be noted that, while the image pickup cycle is 1/60 second, the cycle is not limited to this. For example, the solid-state image pickup device 200 may perform image pickup after every 1/30 second.

Figure 8:
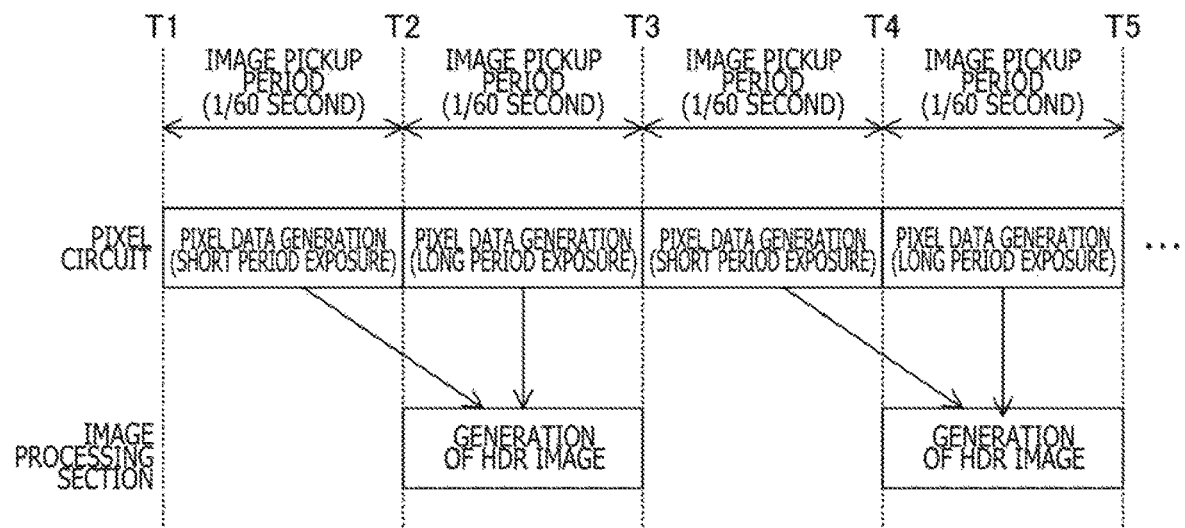
FIG. 8 is a timing chart depicting an example of operation of a solid-state image pickup device according to a comparative example.

FIG. 8 is a timing chart depicting an example of operation of a solid-state image pickup device in a comparative example. It is assumed that the solid-state image pickup device of this comparative example does not measure the reception light amount for each pixel but performs image pickup applying an equal length to exposure periods for all pixels.

At first timing T1, all pixel circuits in the solid-state image pickup device generate pixel data by exposure for a short period of time. At timing T2 after 1/60 second from timing T1 elapses, all pixel circuits generate pixel data by exposure for a long period of time. Further, the image processing section at the succeeding stage synthesizes the image data by the short period exposure and the image data by the long period exposure to generate an HDR image. After timing T3 after 1/60 second from timing T2 elapses, synthesis of an HDR image is executed after every 1/30 second.

In this manner, in the comparative example, since a plurality of image data are synthesized to generate an HDR image (frame), the frame rate decreases in comparison with that in an alternative case in which such synthesis is not performed. For example, in the case where an ordinary image is picked up at a frame rate of 60 Hertz (Hz) and two normal ordinary images are synthesized to generate an HDR image, the frame rate of an HDR decreases to 30 Hertz (Hz).

In contrast, since the solid-state image pickup device 200 measures the reception light amount for each pixel circuit 240 and switches the exposure period as exemplified in FIG. 8, an HDR image can be generated after every cycle (image pickup cycle) of the vertical synchronizing signal VSYNC. For example, in the case where the frequency of the vertical synchronizing signal VSYNC is equal to that in the comparative example, the solid-state image pickup device 200 can pick up an HDR image at the frame rate of 60 Hertz (Hz). Accordingly, decrease of the frame rate when an HDR image is picked up can be suppressed.

Figure 9:
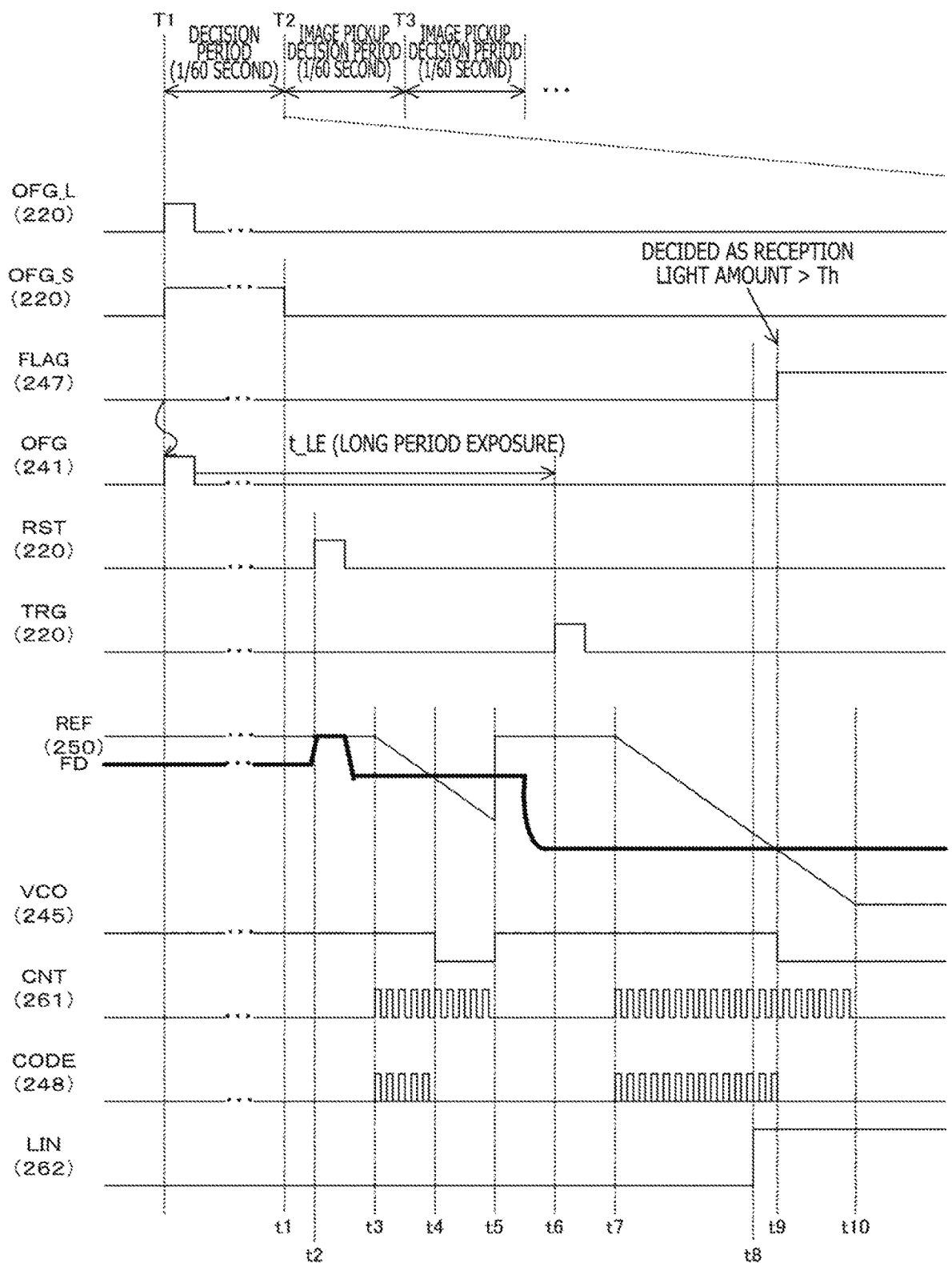
FIG. 9 is a timing chart depicting an example of operation within a decision period of the solid-state image pickup device in the first embodiment of the present technology.

FIG. 9 is a timing chart depicting an example of operation within a decision period of the solid-state image pickup device 200 according to the first embodiment. First, at timing T1, the control signals OFG_L and OFG_S are controlled to the high level over pulse periods different from each other. If the initial value of the decision flag FLAG is set, for example, to the low level, then the switch 241 selects the control signal OFG_L on the basis of the value of the decision flag FLAG and outputs the control signal OFG_L as OFG. Consequently, long period exposure of the exposure period t_LE is started.

Then, at timing t2, the reset signal RST is supplied and the voltage (FD) of the floating diffusion layer is initialized to its initial value (for example, to a level of a comparative degree to the reference voltage REF). If the reset signal RST falls, then the voltage FD is fluctuated by feed-through or charge injection. A component of the fluctuation is counted as a reset level after timing t3.

The reference voltage REF of the ramp signal gradually decreases over a period from timing t3 to timing t5. Further, at timing t3, the timing generation section 270 initializes and causes the up counter 261 to start its counting.

When the input voltage FD becomes higher than the reference voltage REF at timing t4, the comparator output signal VCO is inverted to the low level. Further, the digital signal retention section 248 retains the count value CNT at timing t4 as a signal of the reset level. This reset level is outputted to the interface 210.

Then, at timing t5 immediately before the long period exposure ends, the reference voltage REF rises until it becomes equal to or higher than the input voltage FD and the comparator output signal VCO becomes the high level. Further, at timing t5, the timing generation section 270 stops the clock signal CLK to the up counter 261 so as to stop its counting.

When the transfer signal TRG is supplied at timing t6, charge of the photodiode 243 is fully transferred to the floating diffusion layer, and the voltage (FD) of the same drops. Consequently, the long period exposure ends. The reference voltage REF of the ramp signal gradually drops after timing t7. Further, at timing t7, the timing generation section 270 initializes the up counter 261 so as to start its counting.

Since the count value CNT exceeds the set value at timing t8, the decision flag generation section 262 sets the latch input signal LIN to the high level. Then, when the input voltage FD becomes higher than the reference voltage REF at timing t9, the comparator output signal VCO is inverted to the low level. At timing t9 at which the comparator output signal VCO is inverted, the decision flag retention section 247 retains the latch input signal LIN of the high level as the decision flag FLAG. Further, the digital signal retention section 248 retains the count value CNT at timing t9 as a signal level. This signal level is outputted to the interface 210.

In FIG. 9, since the comparator output signal VCO is inverted after the count value CNT exceeds the set value, the decision flag FLAG of the high level is retained. This decision flag FLAG of the high level indicates that the reception light amount exceeds a predetermined value Th (saturation level or the like).

It is to be noted that, in the case where the level of the input voltage FD is higher than a fluctuation amount of the ramp signal, also at timing t10 at which the fluctuation of the ramp signal stops, the comparator output signal VCO is not inverted. In this case, at timing t10, the driver 220 compulsorily inverts the comparator output signal VCO such that the decision flag FLAG is retained into the decision flag retention section 247.

Figure 10:
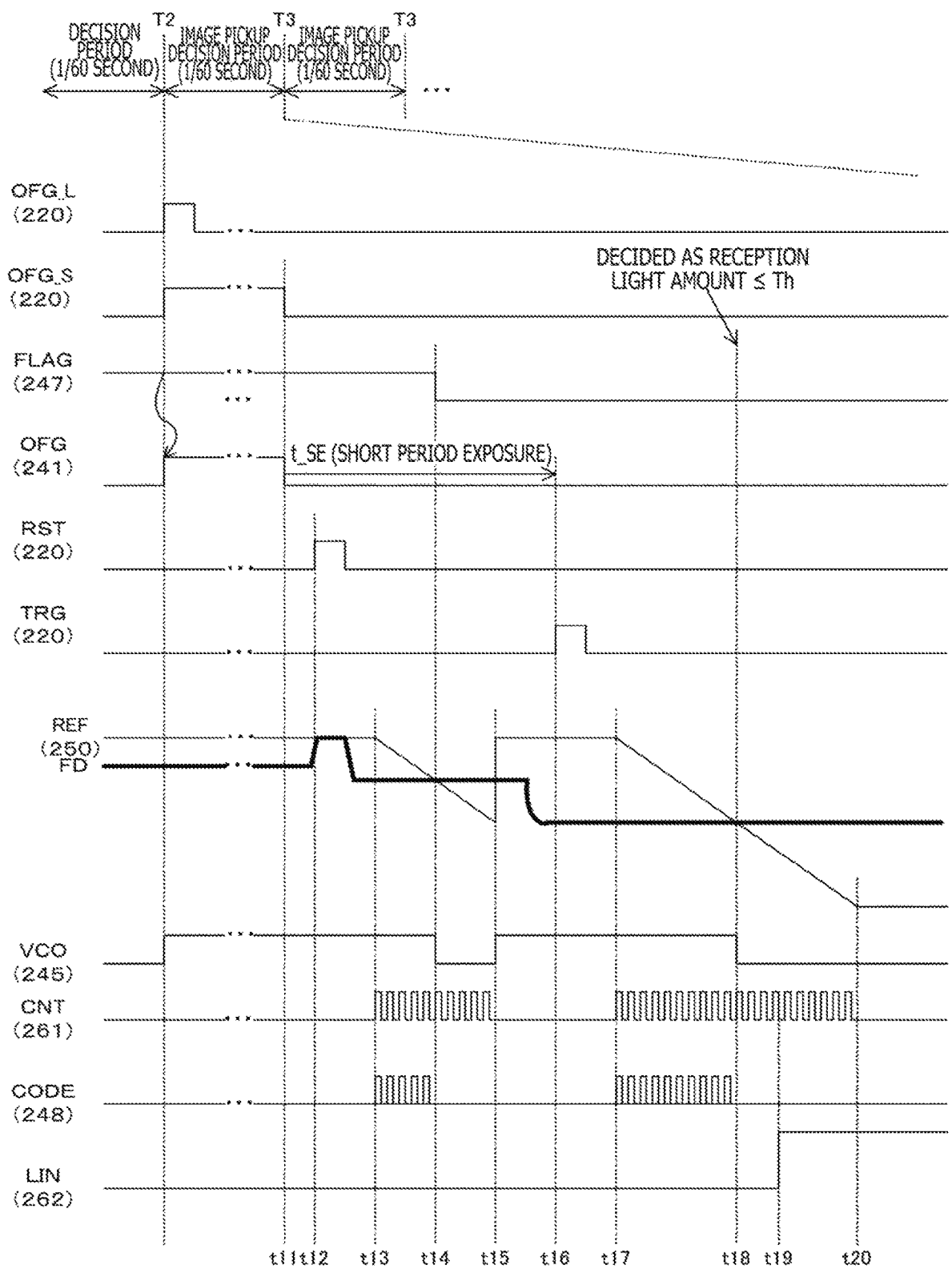
FIG. 10 is a timing chart depicting an example of operation within an image pickup decision period of the solid-state image pickup device in the first embodiment of the present technology.

FIG. 10 is a timing chart depicting an example of operation within an image pickup decision period of the solid-state image pickup device 200 in the first embodiment. At timing T2, the control signals OFG_L and OFG_S are controlled to the high level over pulse periods different from each other. Since the decision flag FLAG retained in the preceding cycle is the high level (namely, since the reception light amount exceeds the predetermined value), the switch 241 selects and outputs the control signal OFG_S as OFG. Consequently, short period exposure of the exposure period t_SE is started.

Then, within a period after timing t12 till timing t15, the reset level is AD (Analog to Digital) converted, and within a period after timing t15 till timing t20, the signal level is AD converted.

Further, when the input voltage FD becomes higher than the reference voltage REF at timing t18, the comparator output signal VCO is inverted to the low level. At timing t18 at which the comparator output signal VCO is inverted, the decision flag retention section 247 retains the latch input signal LIN of the low level as the decision flag FLAG.

Then, at timing t19 after then, the count value CNT exceeds the set value, and consequently, the decision flag generation section 262 sets the latch input signal LIN to the high level.

In FIG. 10, since the comparator output signal VCO is inverted before the count value CNT exceeds the set value, the decision flag FLAG of the low level is retained. This decision flag FLAG of the low level indicates that the reception light amount is equal to or lower than the predetermined value Th.

[Example of Configuration of Image Processing Section]

Figure 11:
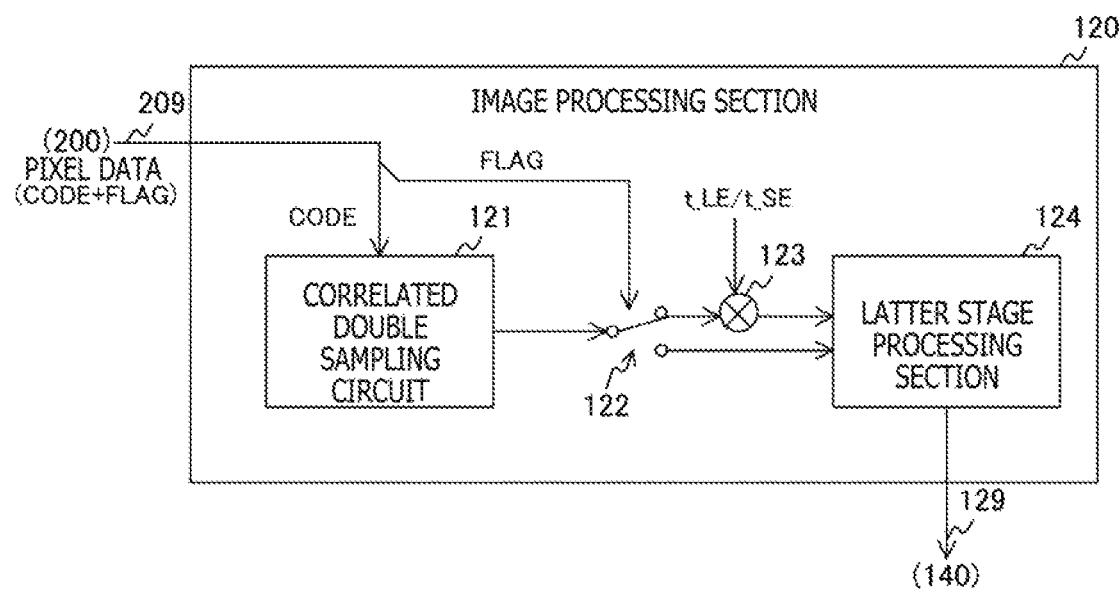
FIG. 11 is a block diagram depicting an example of an image processing section in the first embodiment of the present technology.

FIG. 11 is a block diagram depicting an example of a configuration of the image processing section 120 in the first embodiment. The image processing section 120 includes a correlated double sampling circuit 121, a switch 122, a multiplier 123 and a latter stage processing section 124.

The correlated double sampling circuit 121 performs a CDS (Correlated Double Sampling) process for calculating a difference between the reset level and the signal level in the digital signal CODE. By the CDS process, reset noise, a threshold value dispersion of transistors and so forth can be reduced. The correlated double sampling circuit 121 supplies a pixel value after the CDS process to the switch 122.

The switch 122 selects one of the multiplier 123 and the latter stage processing section 124 as an output destination in response to the decision flag FLAG and outputs a pixel value from the correlated double sampling circuit 121 to the output destination. In the case where the decision flag FLAG has the high level (namely, in the case where the reception light amount exceeds the predetermined value), the switch 122 outputs the pixel value to the multiplier 123. On the other hand, in the case where the decision flag FLAG has the low level, the switch 122 outputs the pixel value to the latter stage processing section 124.

The multiplier 123 multiplies the pixel value from the switch 122 by t_LE/t_SE that is an exposure ratio between long period exposure and short period exposure. The multiplier 123 supplies the pixel value after the multiplication to the latter stage processing section 124.

The latter stage processing section 124 executes various image processes such as a demosaic process and a white balance process and supplies a result of the processes to the recording section 140.

By the multiplier 123, a pixel value of a bright pixel whose reception light amount exceeds the predetermined value is amplified. On the other hand, the pixel value of a dark pixel whose reception light amount is lower than the predetermined value is not amplified. Therefore, the dynamic range of image data is expanded by a magnification equal to the exposure ratio, and an HDR image is obtained.

It is to be noted that, although the image processing section 120 performs an adjustment process for amplifying the pixel value only of a bright pixel, if the dynamic range is expanded, then an adjustment process other than this process may be performed. For example, the image processing section 120 may attenuate only the pixel value of a dark pixel without amplifying the pixel value of a bright pixel. Further, the image processing section 120 may perform both amplification of the pixel value of a bright pixel and attenuation of the pixel value of a dark pixel.

[Example of Operation of Image Pickup Apparatus]

Figure 12:
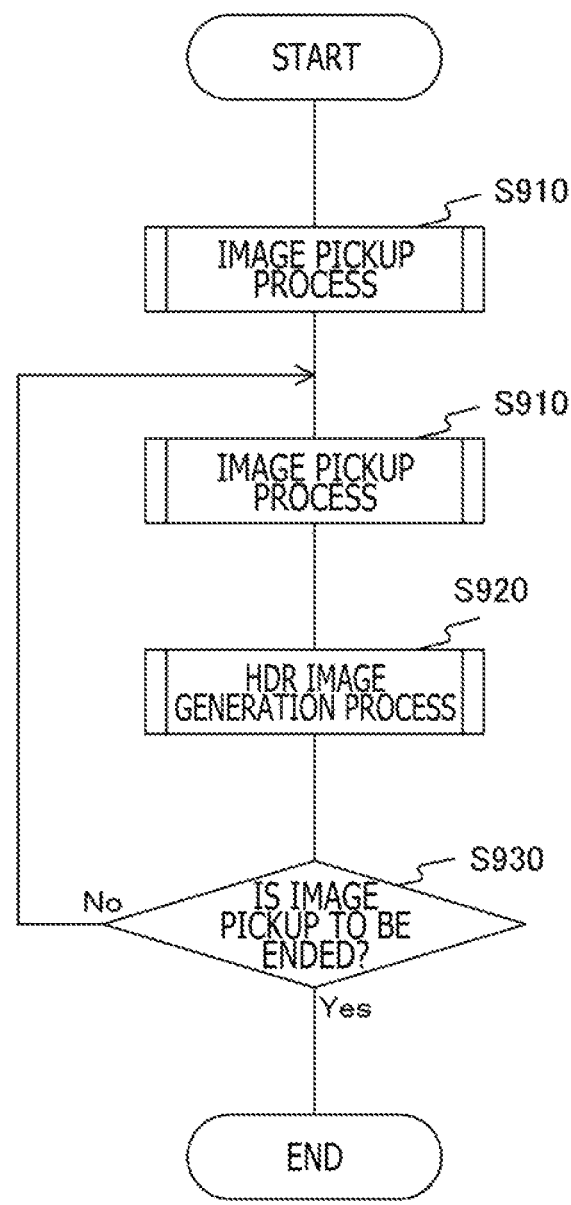
FIG. 12 is a flow chart depicting an example of operation of the image pickup apparatus in the first embodiment of the present technology.

FIG. 12 is a flow chart depicting an example of operation of the image pickup apparatus 100 in the first embodiment. This operation is started, for example, when an operation (depression of a shutter button or the like) for starting image pickup of an HDR image is performed.

The solid-state image pickup device 200 executes an image pickup process (S910) for picking up image data. In the first image pickup process, an ordinary image is picked up. Then, the solid-state image pickup device 200 executes the image pickup process (step S910) again, and the image processing section 120 executes an HDR image generation process (step S920) for generating an HDR image. Then, after step S920, the image pickup apparatus 100 decides whether or not image pickup is to be ended in response to an operation for stopping image pickup or the like (step S930).

In the case where image pickup is not to be ended (step S930: No), the image pickup apparatus 100 repeats step S910 again. On the other hand, in the case where image pickup is to be ended (step S930: Yes), the image pickup apparatus 100 ends the operation for image pickup.

Figure 13:
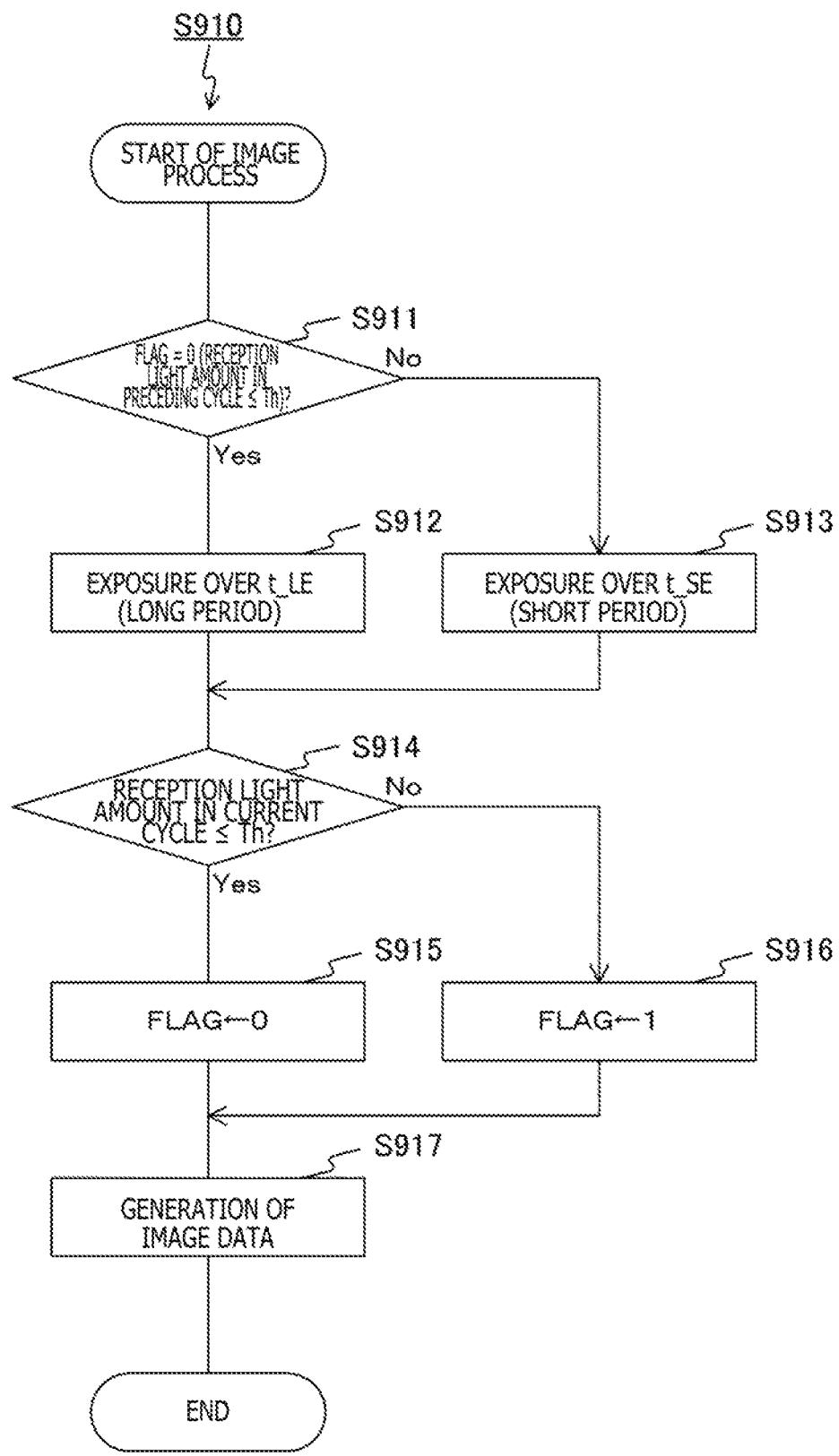
FIG. 13 is a flow chart depicting an example of an image pickup process in the first embodiment of the present technology.

FIG. 13 is a flow chart depicting an example of the image pickup process in the first embodiment. The pixel circuit 240 in the solid-state image pickup device 200 decides whether or not the decision flag FLAG has the low level (namely, whether or not the reception light amount in the preceding cycle is equal to or smaller than the predetermined value Th) (step S911). In the case where the decision flag FLAG has the low level (step S911: Yes), the pixel circuit 240 performs exposure over the long period of time of t_LE (step S912). On the other hand, in the case where the decision flag FLAG has the high level (step S911: No), the pixel circuit 240 performs exposure over a short time period of t_SE (step S913).

After step S912 or S913, the pixel circuit 240 decides whether or not the reception light amount in the present cycle is equal to or smaller than the predetermined value Th (step S914). In the case where the reception light amount is equal to or smaller than the predetermined value Th (step S914: Yes), the pixel circuit 240 sets and retains the low level to and in a decision flag (step S915). On the other hand, in the case where the reception light amount exceeds the predetermined value Th (step S914: No), the pixel circuit 240 sets and retains the high level to and in the decision flag (step S916). After step S915 or S916, the pixel circuit 240 generates and outputs pixel data (step S917).

Figure 14:
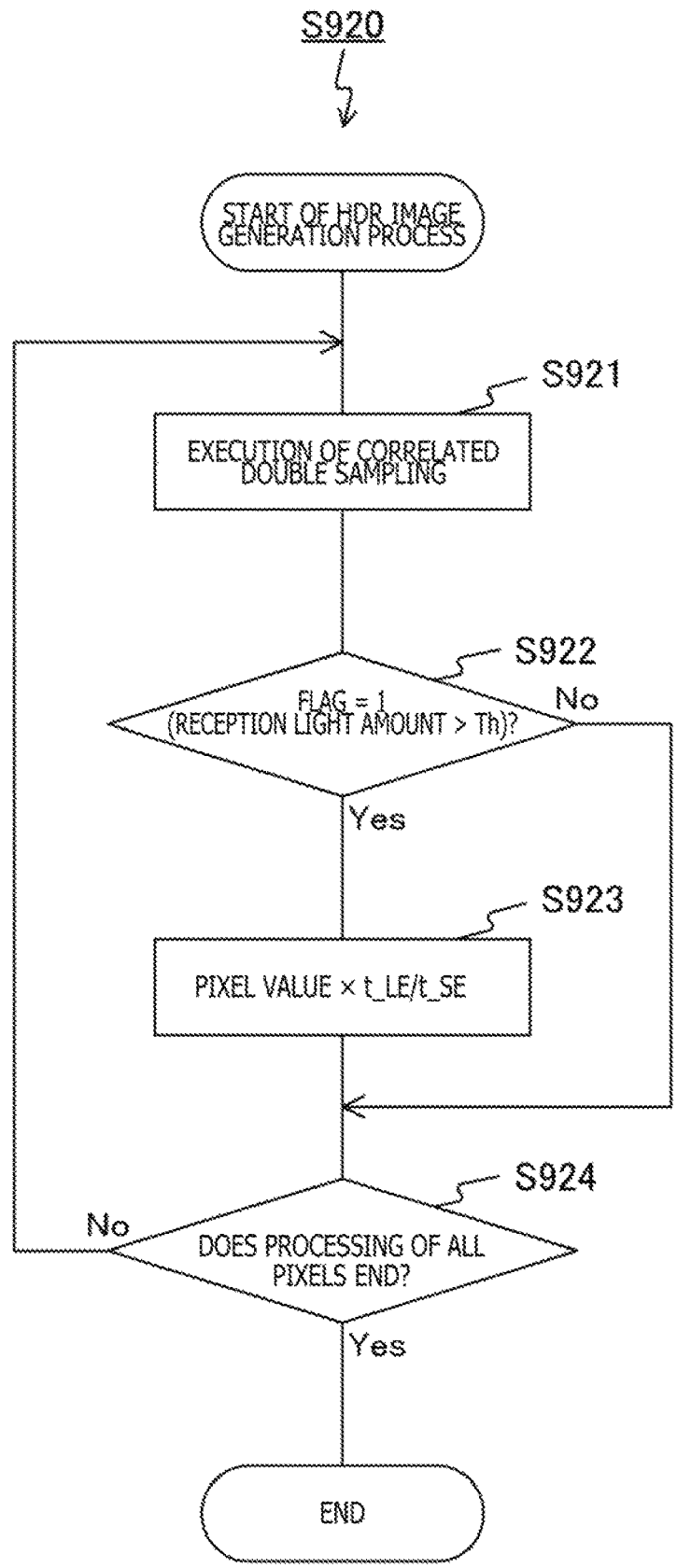
FIG. 14 is a flow chart depicting an example of an HDR (High Dynamic Range) image generation process in the first embodiment of the present technology.

FIG. 14 is a flow chart depicting an example of the HDR image generation process in the first embodiment. The image processing section 120 executes a correlated double sampling process for the inputted pixel data (step S921).

Then, the image processing section 120 decides whether or not the decision flag FLAG of the pixel data has the high level (namely, whether or not the reception light amount exceeds the predetermined value Th) (step S922).

In the case where the decision flag FLAG has the high level (step S922: Yes), the image processing section 120 multiplies the pixel values by the exposure rate (t_LE/t_SE) (step S923). In the case where the decision flag FLAG has the low level (step S922: No), or after step S923, the image processing section 120 decides whether or not the process for all pixels ends (step S924). In the case where the process for all pixels does not end (step S924: No), the image processing section 120 repetitively executes the steps beginning with step S921. On the other hand, in the case where the process for all pixels ends (step S924: Yes), the image processing section 120 ends the HDR image generation process.

In this manner, according to the first embodiment of the present technology, each of the pixel circuits 240 measures the reception light amount and performs exposure over an exposure period selected in response to a result of the measurement to generate pixel data. Therefore, an HDR image can be generated from image data of one image. Consequently, the frame rate of the HDR image can be improved in comparison with that in an alternative case in which image data of a plurality of images are synthesized.

2. Second Embodiment

In the first embodiment described above, the solid-state image pickup device 200 AD converts a reset level and a signal level in order by the up counter 261. However, in this configuration, it is necessary for the image processing section 120 to acquire, when reset noise and so forth are to be reduced, AD conversion values of the reset level and the signal level to execute a CDS process, and therefore, the processing load to the image processing section 120 increases. The solid-state image pickup device 200 in the second embodiment is different from that in the first embodiment in that the processing amount of the image processing section 120 is reduced.

Figure 15:
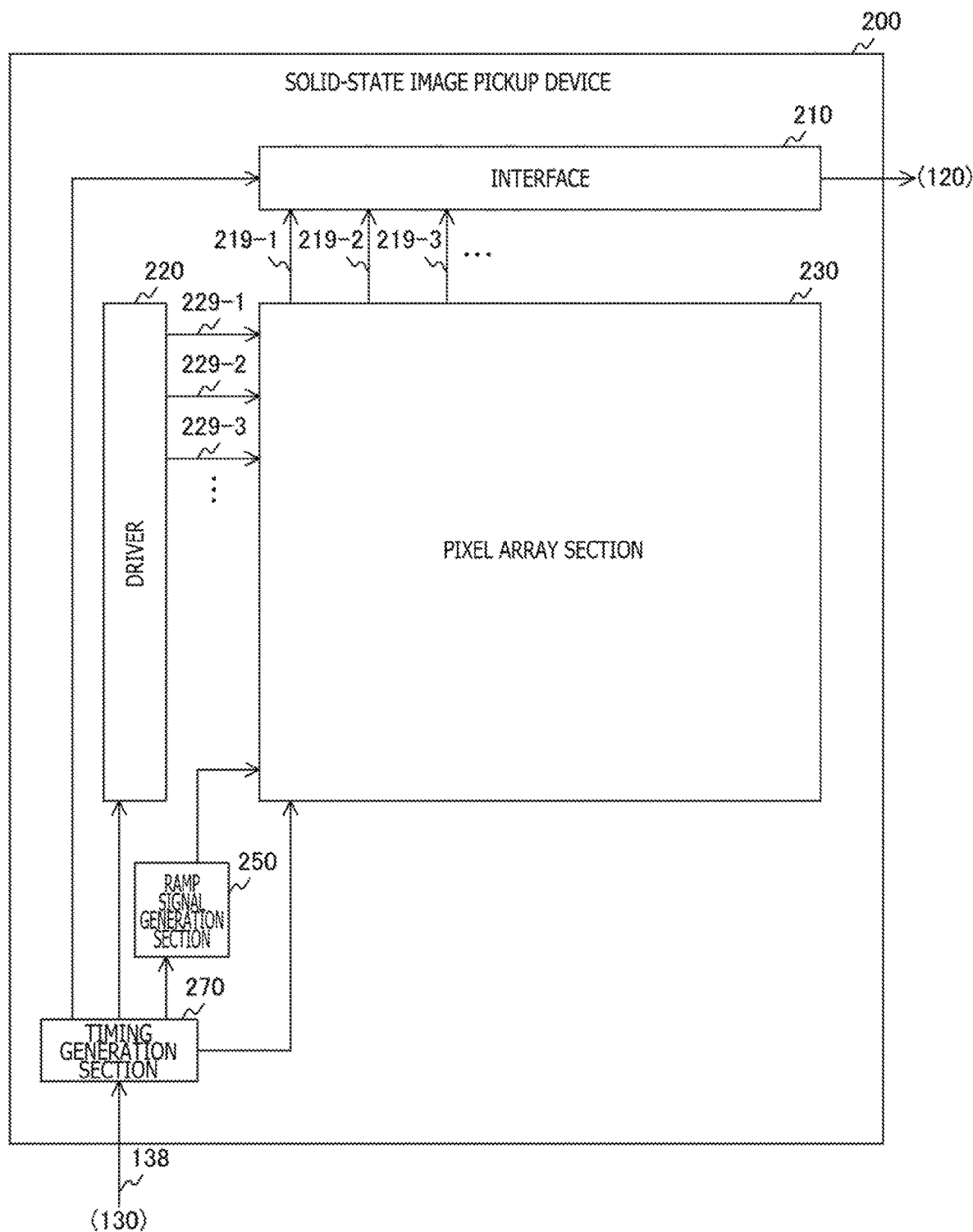
FIG. 15 is a block diagram depicting an example of a configuration of a solid-state image pickup device in a second embodiment of the present technology.

FIG. 15 is a block diagram depicting an example of a configuration of the solid-state image pickup device 200 in the second embodiment. The solid-state image pickup device 200 in the second embodiment is different from that in the first embodiment in that it does not include the counting section 260.

Figure 16:
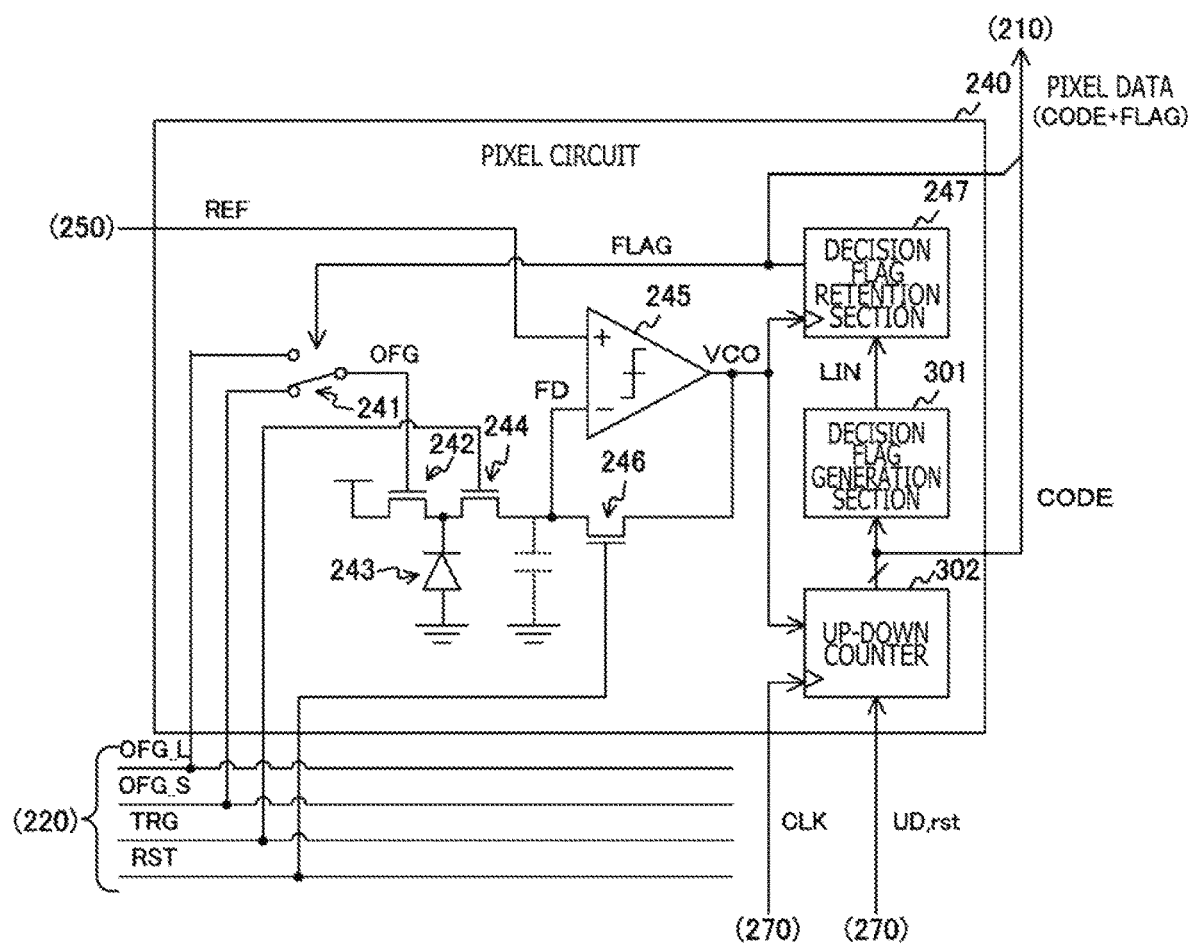
FIG. 16 is a circuit diagram depicting an example of a configuration of a pixel circuit in the second embodiment of the present technology.

FIG. 16 is a circuit diagram depicting an example of a configuration of the pixel circuit 240 in the second embodiment. The pixel circuit 240 in the second embodiment is different from that in the first embodiment in that it includes a decision flag generation section 301 and an up-down counter 302 in place of the digital signal retention section 248.

The up-down counter 302 increments or decrements its count value in synchronism with the clock signal CLK. The up-down counter 302 initializes its count value in accordance with the reset signal rst from the timing generation section 270. Further, the up-down counter 302 switches between the incrementing operation and the decrementing operation in accordance with a control signal UD from the timing generation section 270. Further, the up-down counter 302 stops its counting when the comparator output signal VCO is inverted upon each of incrementing operation and decrementing operation. Then, after the incrementing operation ends, the up-down counter 302 supplies its count value CNT to the decision flag generation section 301 and the interface 210.

The decision flag generation section 301 compares the count value CNT and the set value with each other to generate a signal representative of a result of the comparison as a latch input signal LIN. The decision flag generation section 301 supplies the latch input signal LIN to the decision flag retention section 247.

Figure 17:
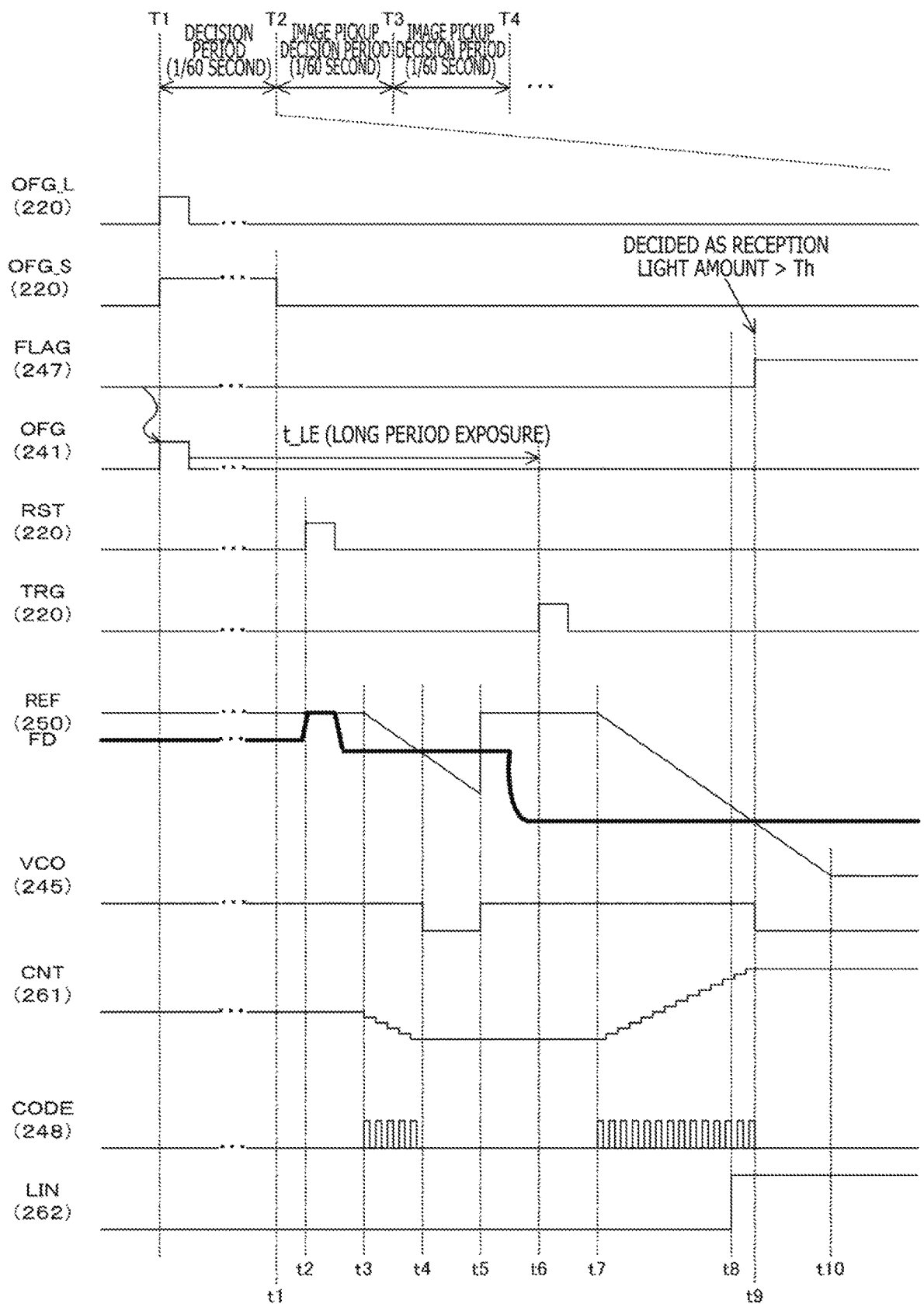
FIG. 17 is a timing chart depicting an example of operation within a decision period of the solid-state image pickup device in the second embodiment of the present technology.

FIG. 17 is a time chart depicting an example of operation within a decision period of the solid-state image pickup device in the second embodiment. Since the initial value of the decision flag FLAG is the low level, the control signal OFG_L is selected at timing T1 and long period exposure is started. When the reference voltage REF begins to decrease at timing t3, the up-down counter 302 initializes its count value and starts decrementing of the count value. Then, when the comparator output signal VCO is inverted at timing t4, the up-down counter 302 stops its counting.

Then, when the reference voltage REF begins to decrease at timing t7, the up-down counter 302 sets the value upon the end of the decrementing as an initial value and starts incrementing of the count value CNT. Then, when the comparator output signal VCO is inverted at timing t9, the up-down counter 302 stops its counting. The count value CNT at this time indicates the difference between the reset level and the signal level. In particular, a CDS process is executed by the up-down counter 302. Since the count value CNT is higher than the set value (namely, since the exposure light amount exceeds the predetermined value Th), a decision flag FLAG of the high level is generated at timing t9.

It is to be noted that, although the up-down counter 302 performs incrementing subsequently to decrementing, it may conversely perform decrementing subsequently to incrementing.

Figure 18:
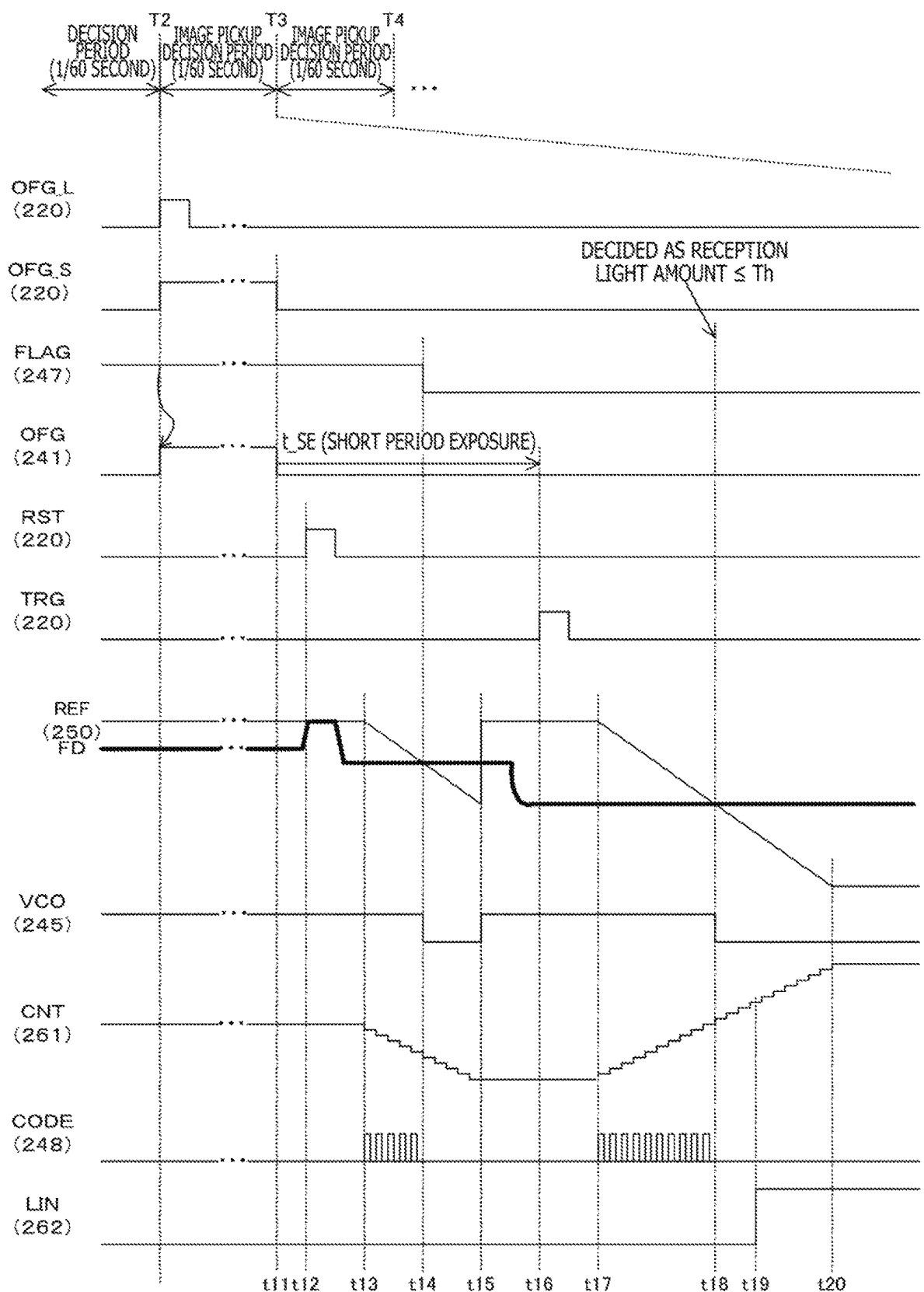
FIG. 18 is a flow chart depicting an example of operation within an image pickup decision period of the solid-state image pickup device in the second embodiment of the present technology.

FIG. 18 is a timing chart depicting an example of operation within the image pickup decision period of the solid-state image pickup device in the second embodiment. Since the decision flag FLAG in the preceding cycle is the high level, the control signal OFG_S is selected at timing T2 and short period exposure is started. Then, since the count value CNT after the incrementing is equal to or lower than the set value (namely, since the exposure light amount is equal to or smaller than the predetermined value Th), a decision flag FLAG of the low level is generated at timing t18.

Figure 19:
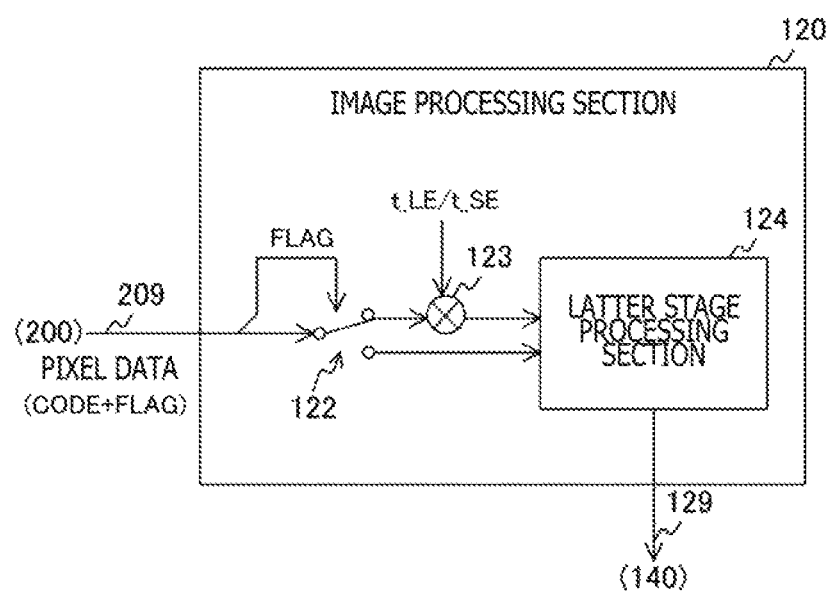
FIG. 19 is a block diagram depicting an example of a configuration of an image processing section in the second embodiment of the present technology.

FIG. 19 is a block diagram depicting an example of a configuration of the image processing section 120 in the second embodiment. The image processing section 120 in the second embodiment is similar to that in the first embodiment except that the correlated double sampling circuit 121 is not provided therein. As described hereinabove, since the CDS process is executed by the up-down counter 302, the correlated double sampling circuit 121 becomes unnecessary.

In this manner, according to the second embodiment of the present technology, since the up-down counter 302 in the pixel circuit 240 performs the CDS process, it becomes unnecessary for the image processing section 120 at the succeeding stage to perform the CDS process. Consequently, the processing amount of the image processing section 120 can be reduced.

3. Third Embodiment

While, in the second embodiment described above, the solid-state image pickup device 200 measures the reception light amount for each pixel, the unit for measuring the reception light amount is not limited to one pixel, and the reception light amount may be measured for each region that includes a plurality of pixels. The solid-state image pickup device 200 in the third embodiment is different from that in the second embodiment in that it measures the reception light amount for each light reception region that includes a plurality of pixels.

Figure 20:
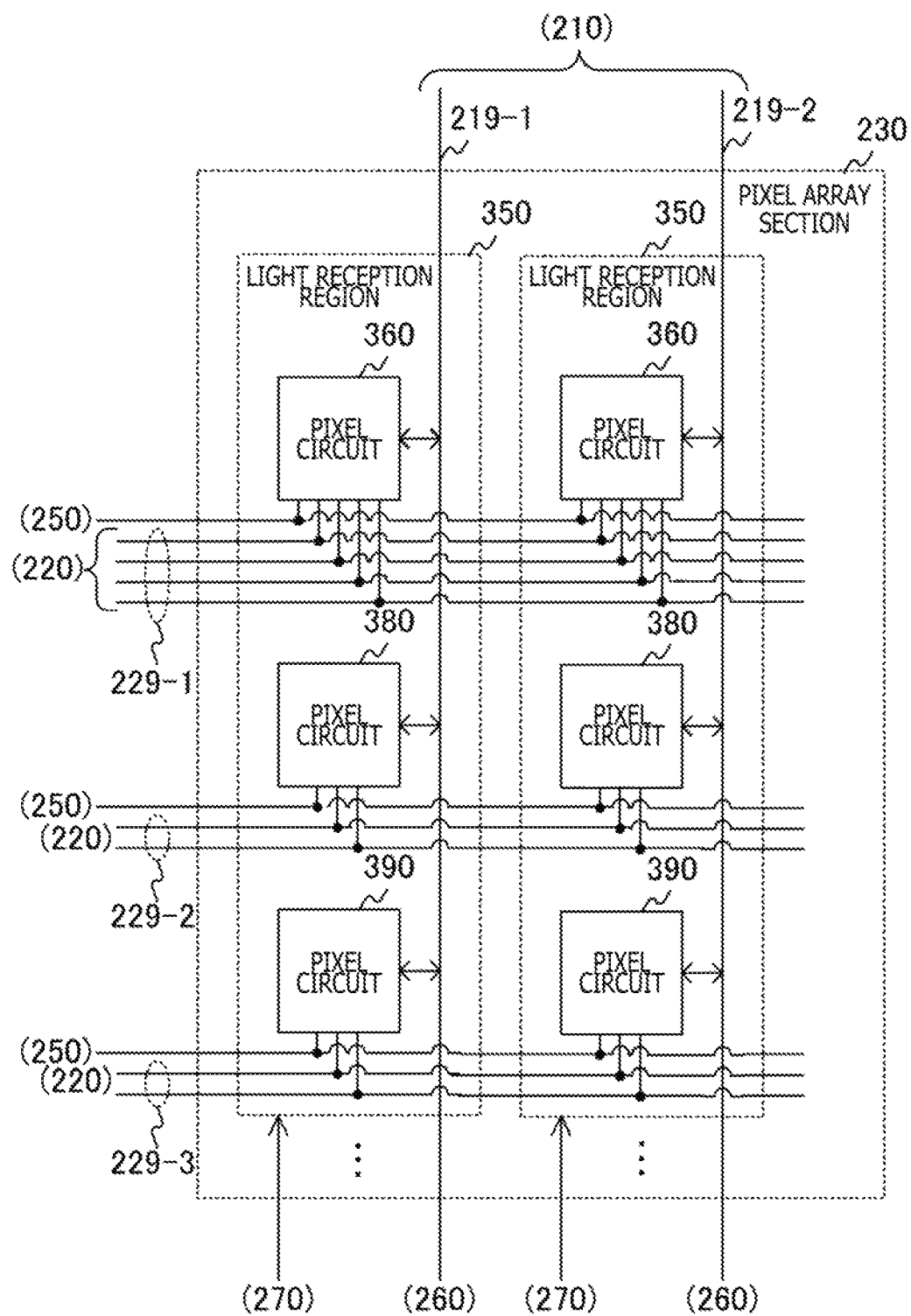
FIG. 20 is a block diagram depicting an example of a configuration of a pixel array section in a third embodiment of the present technology.

FIG. 20 is a block diagram depicting an example of a configuration of the pixel array section 230 in the third embodiment. The pixel array section 230 of the third embodiment is different from that in the first embodiment in that it is divided by a plurality of light reception regions 350. In each of the light reception regions 350, pixel circuits 360, 380 and 390 arrayed in a column direction are provided.

It is to be noted that, while the pixel number in each of the light reception regions 350 is three, the pixel number may be two or more and is not limited to three.

Figure 21:
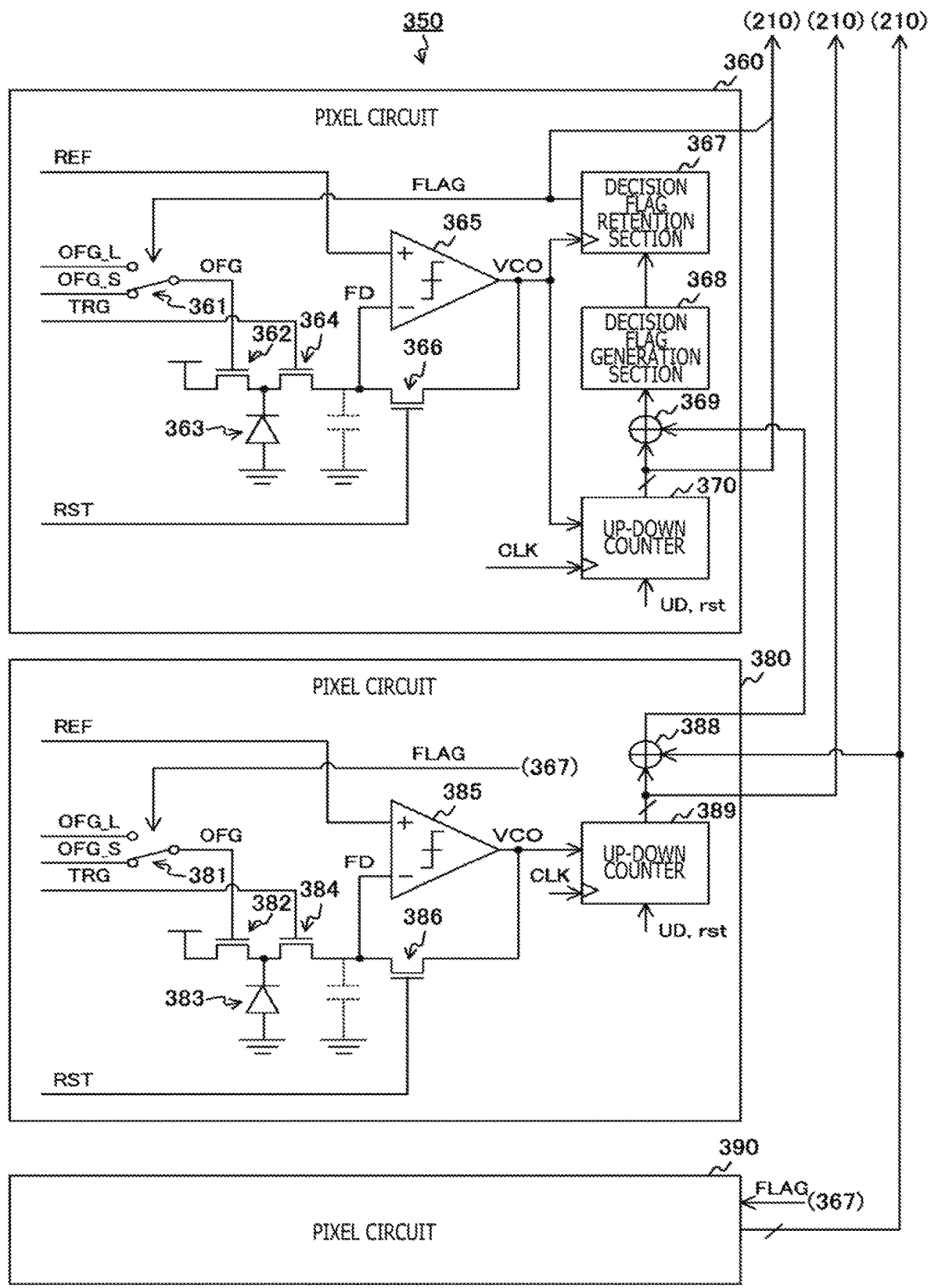
FIG. 21 is a circuit diagram depicting an example of a configuration of a pixel circuit in the third embodiment of the present technology.

FIG. 21 is a circuit diagram depicting an example of a configuration of the pixel circuits 360 and 380 in the third embodiment. The pixel circuit 360 includes a switch 361, a PD reset transistor 362, a photodiode 363, a transfer transistor 364, a comparator 365 and an FD reset transistor 366. The pixel circuit 360 further includes a decision flag retention section 367, a decision flag generation section 368, an adder 369 and an up-down counter 370.

The configuration of the pixel circuit 360 is similar to that of the pixel circuit 240 in the second embodiment exemplified in FIG. 16 except that it further includes the adder 369.

The pixel circuit 380 includes a switch 381, a PD reset transistor 382, a photodiode 383, a transfer transistor 384, a comparator 385 and an FD reset transistor 386. The pixel circuit 380 further includes an adder 388 and an up-down counter 389.

The configuration of the pixel circuit 380 is similar to that of the pixel circuit 240 in the second embodiment exemplified in FIG. 16 except that it includes the adder 388 in place of the decision flag generation section 301 and the decision flag retention section 247. Further, the configuration of the pixel circuit 390 is similar to that of the pixel circuit 380.

The up-down counter 389 supplies a count value CNT thereof to the adder 388 and the interface 210. The adder 388 adds the count value CNT of the pixel circuit 380 and the count value CNT of the pixel circuit 390. The adder 388 supplies a result of the addition to the pixel circuit 360.

The adder 369 adds the result of addition from the pixel circuit 380 to the count value CNT of the pixel circuit 360. The adder 369 supplies a result of the addition to the decision flag generation section 368. This result of addition is an integrated value of the count values CNT of the pixel circuits 360, 380 and 390 and indicates the reception light amount of the light reception region 350.

The decision flag generation section 368 generates a latch input signal LIN indicative of whether or not the reception light amount of the light reception region 350 exceeds a predetermined value and supplies the latch input signal LIN to the decision flag retention section 367. The decision flag retention section 367 retains the latch input signal LIN when the comparator output signal VCO is inverted as a flag and supplies the retained value to the switch 361 and the pixel circuits 380 and 390.

By the configuration described above, the reception light amount is measured for each light reception region 350, and each of the pixels in the light reception region 350 can select an exposure period in response to a result of the measurement (decision flag FLAG).

In this manner, according to the third embodiment of the present technology, the reception light amount is measured for each light reception region 350 configured from a plurality of pixels, and exposure is performed over an exposure period selected in accordance with a result of the measurement to generate image data. Therefore, an HDR image can be generated from image data of one image.

4. Fourth Embodiment

Although, in the first embodiment described above, each of circuits in the solid-state image pickup device 200 is disposed on one semiconductor substrate, if it is assumed that the area of the semiconductor substrate is fixed, then it becomes necessary to miniaturize pixels as the number of pixels increases. By such miniaturization, the area of a photodiode in each pixel becomes small, which makes it difficult to maintain a pixel characteristic such as the sensitivity. The solid-state image pickup device 200 in the fourth embodiment is different from that in the first embodiment in that the area of the photodiode is increased.

Figure 22:
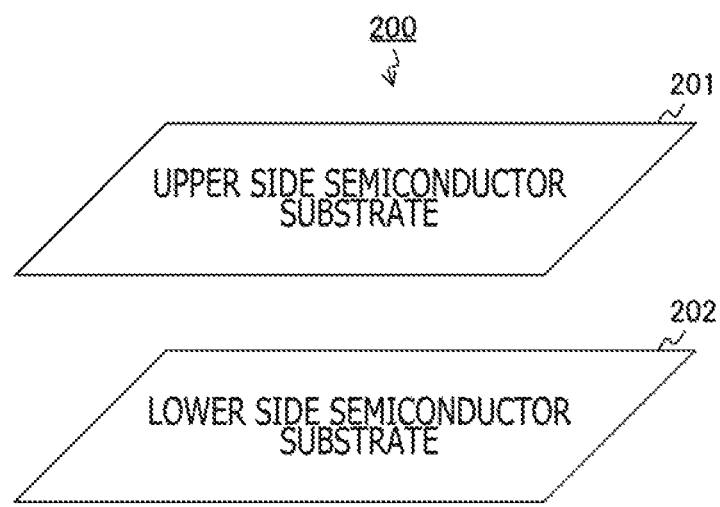
FIG. 22 is a perspective view depicting an example of a configuration of a solid-state image pickup device in a fourth embodiment of the present technology.

FIG. 22 is a perspective view depicting an example of a configuration of the solid-state image pickup device 200 in the fourth embodiment. The solid-state image pickup device 200 of the fourth embodiment includes a lower side semiconductor substrate 202 and an upper side semiconductor substrate 201 stacked on the substrate.

Figure 23:
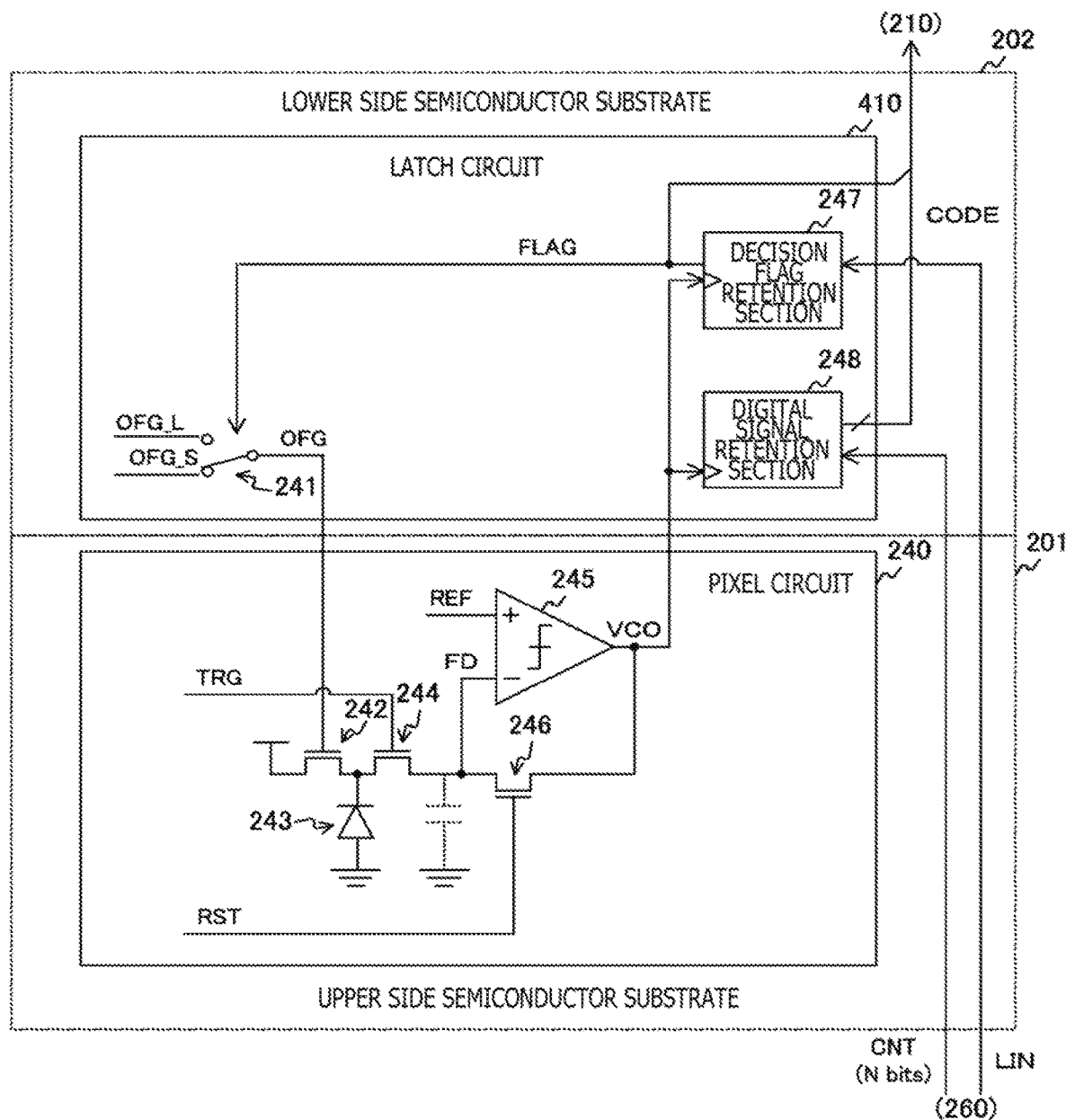
FIG. 23 is a block diagram depicting an example of a configuration of the solid-state image pickup device in the fourth embodiment of the present technology.

FIG. 23 is a block diagram depicting an example of a configuration of the solid-state image pickup device 200 in the fourth embodiment. On the lower side semiconductor substrate 202, a plurality of latch circuits 410 are arrayed in a two-dimensional lattice, and on the upper side semiconductor substrate 201, a plurality of pixel circuits 240 are arrayed in a two-dimensional lattice. Further, an interface 210, a driver 220, a ramp signal generation section 250, a counting section 260 and a timing generation section 270 in the solid-state image pickup device 200 are disposed on the lower side semiconductor substrate 202.

The configuration of the pixel circuit 240 in the fourth embodiment is similar to that in the first embodiment except that the switch 241, the decision flag retention section 247 and the digital signal retention section 248 are not provided thereon. The switch 241, decision flag retention section 247 and the digital signal retention section 248 are provided in the latch circuit 410.

It is to be noted that, while the circuits in the solid-state image pickup device 200 are distributed to the two stacked semiconductor substrates, they may otherwise be distributed to three or more semiconductor substrates. Further, while the switch 241, the decision flag retention section 247 and the digital signal retention section 248 in the solid-state image pickup device 200 are provided on one of the substrates while the remaining circuits are disposed on the other substrate, the configuration of them is not limited to this configuration. For example, the switch 241 may be disposed on the substrate on the pixel circuit 240 side.

In this manner, according to the fourth embodiment of the present technology, since the circuits in the solid-state image pickup device 200 are distributed to two stacked semiconductor substrates, the area of the photodiode 243 can be increased from that in an alternative case in which the two semiconductor substrates are not stacked. Consequently, deterioration of a pixel characteristic (sensitivity or the like) caused by miniaturization can be suppressed.

5. Fifth Embodiment

In the second embodiment described hereinabove, the solid-state image pickup device 200 selects an exposure period in response to a result of measurement (decision flag FLAG) of the reception light amount measured in a preceding frame upon image pickup of each frame to perform exposure. However, according to this configuration, in the case where the reception light amount exhibits a great difference between the current frame and the preceding frame, there is the possibility that an appropriate exposure period may not be selected, resulting in deterioration of the picture quality. Therefore, it is preferable to select, in each frame, an exposure period in response to the reception light amount measured in an image pickup cycle of a frame. The solid-state image pickup device 200 in the fifth embodiment is different from that the second embodiment in that it selects an appropriate exposure period to improve the picture quality.

Figure 24:
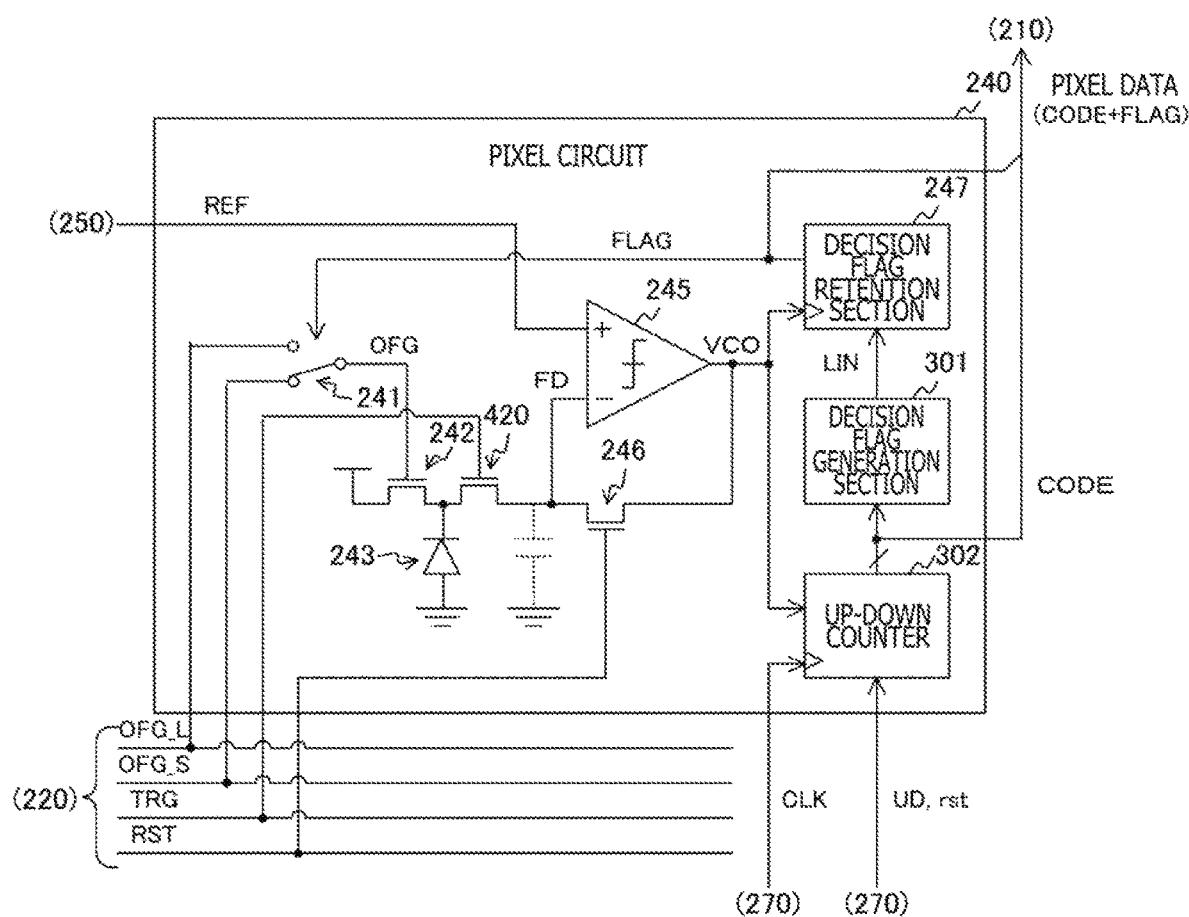
FIG. 24 is a circuit diagram depicting an example of a configuration of a pixel circuit in a fifth embodiment of the present technology.

FIG. 24 is a circuit diagram depicting an example of a configuration of the pixel circuit 240 in the fifth embodiment. The pixel circuit 240 of the fifth embodiment is different from that of the second embodiment in that it includes a transfer transistor 420 in place of the transfer transistor 244.

The transfer transistor 420 is different from the transfer transistor 244 in the second embodiment in that it can control the potential of a channel thereof to three stages. If the driver 220 supplies a transfer signal TRG of the low level, then the potential of the transfer transistor 420 becomes the highest potential. On the other hand, if the driver 220 supplies a transfer signal TRG of the high level, then the potential of the transfer transistor 420 becomes the lowest potential. If the driver 220 supplies a transfer signal TRG of an intermediate level, then the potential of the transfer transistor 420 becomes an intermediate potential between the high potential and the low potential.

With the intermediate potential, charge in the photodiode 243 is not fully transferred, and a supernatant signal of that portion of the charge, which exceeds the intermediate potential, is transferred to the floating diffusion layer. Transfer of charge at the intermediate potential is hereinafter referred to as "intermediate potential transfer." Meanwhile, at the low potential, the charge in the photodiode 243 is fully transferred to the floating diffusion layer. Transfer at the low potential is hereinafter referred to as "full transfer."

Figure 25:
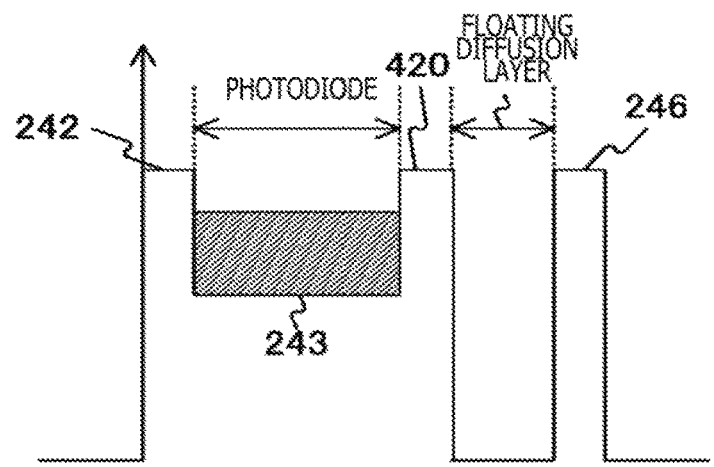
FIG. 25 is an example of a potential diagram till intermediate potential transfer of the pixel circuit in the fifth embodiment of the present technology.
Figure 25:
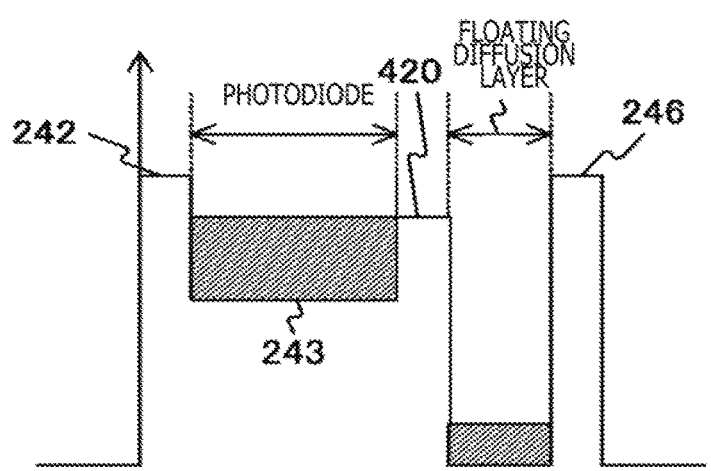
Figure 25:
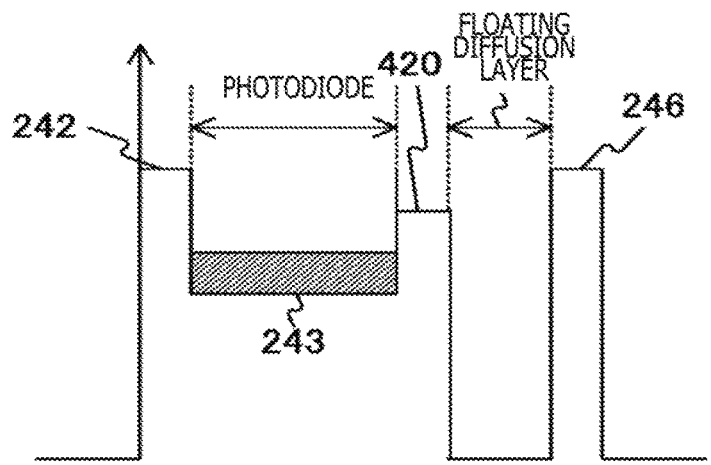

FIG. 25 is an example of a potential diagram till intermediate potential transfer of the pixel circuit 240 in the fifth embodiment. a in FIG. 25 depicts a potential diagram of the pixel circuit 240 immediately before intermediate potential transfer. At this point of time, since the potential of the transfer transistor 420 is sufficiently high, charge of the photodiode 243 is not transferred to the floating diffusion layer.

b in FIG. 25 depicts a potential diagram upon intermediate potential transfer of the pixel circuit 240 where the reception light amount is greater than that in c of FIG. 25. If the driver 220 supplies the transfer signal TRG of the middle level, then the potential at the transfer transistor 420 becomes the intermediate potential. Then, a supernatant signal is transferred from the photodiode 243 to the floating diffusion layer.

c in FIG. 25 depicts a potential diagram upon intermediate potential transfer of the pixel circuit 240 where the reception light amount is smaller than that in b in FIG. 25. In the case where the reception light amount is small, the amount of charge of the photodiode 243 is small and there is little supernatant signal. Since the charge amount to the floating diffusion layer upon intermediate potential transfer varies in response to the reception light amount as exemplified in b and c in FIG. 25, the pixel circuit 240 can generate a decision flag FLAG from the input voltage FD of the floating diffusion layer at this time.

Figure 26:
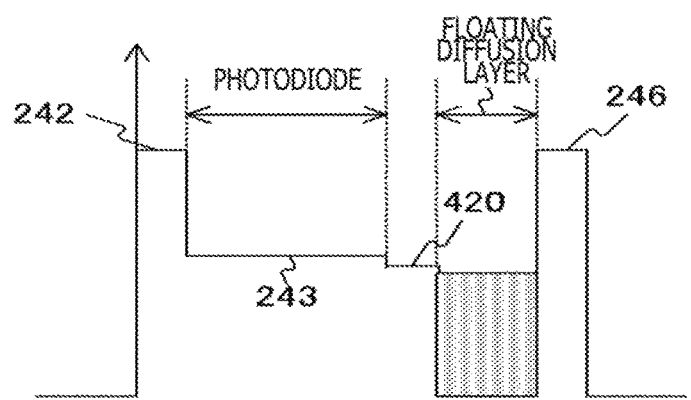
FIG. 26 is an example of a potential diagram upon full transfer of the pixel circuit in the fifth embodiment of the present technology.

FIG. 26 is an example of a potential diagram upon full transfer of the pixel circuit 240 in the fifth embodiment. If the driver 220 supplies the transfer signal TRG of the high level, then the potential of the transfer transistor 420 becomes the low potential. Then, all of charge in the photodiode 243 is transferred to the floating diffusion layer.

Figure 27:
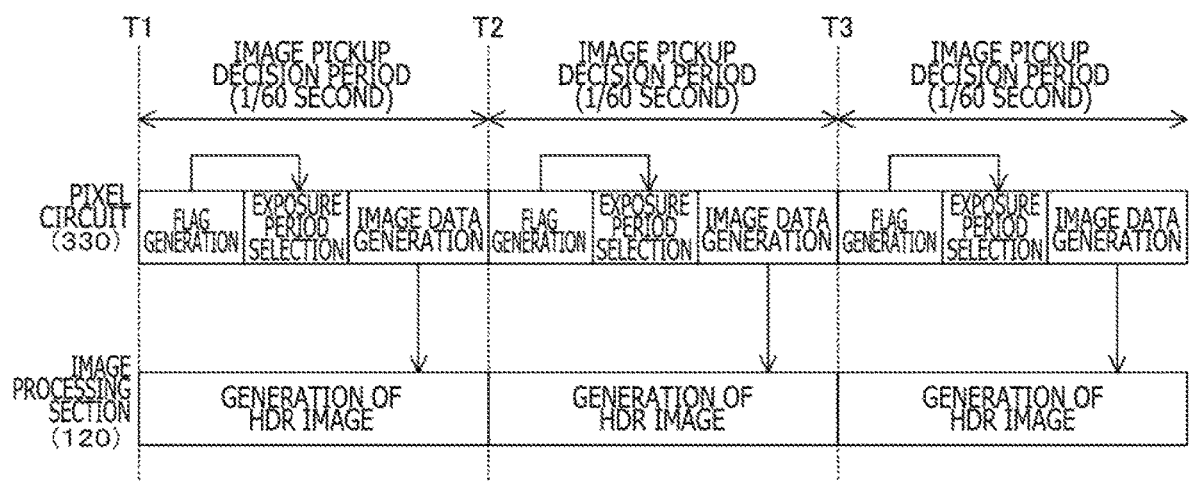
FIG. 27 is an example of a timing chart depicting an example of operation of an image pickup apparatus in the fifth embodiment of the present technology.

FIG. 27 is a timing chart depicting an example of operation of the image pickup apparatus 100 in the fifth embodiment. When first timing T1 is passed, the pixel circuit 240 generates a decision flag FLAG upon intermediate potential transfer. Then, the pixel circuit 240 selects an exposure period in response to the decision flag and performs exposure over the exposure period to generate pixel data. Then, the image processing section 120 refers to the decision flag FLAG to generate an HDR image from two different image data having different exposure periods from each other.

Also at and after timing T2 after 1/60 second from timing T1, the pixel circuit 240 generates a decision flag FLAG in an image pickup cycle similarly to select an exposure period, and the image processing section 120 generates an HDR image.

Figure 28:
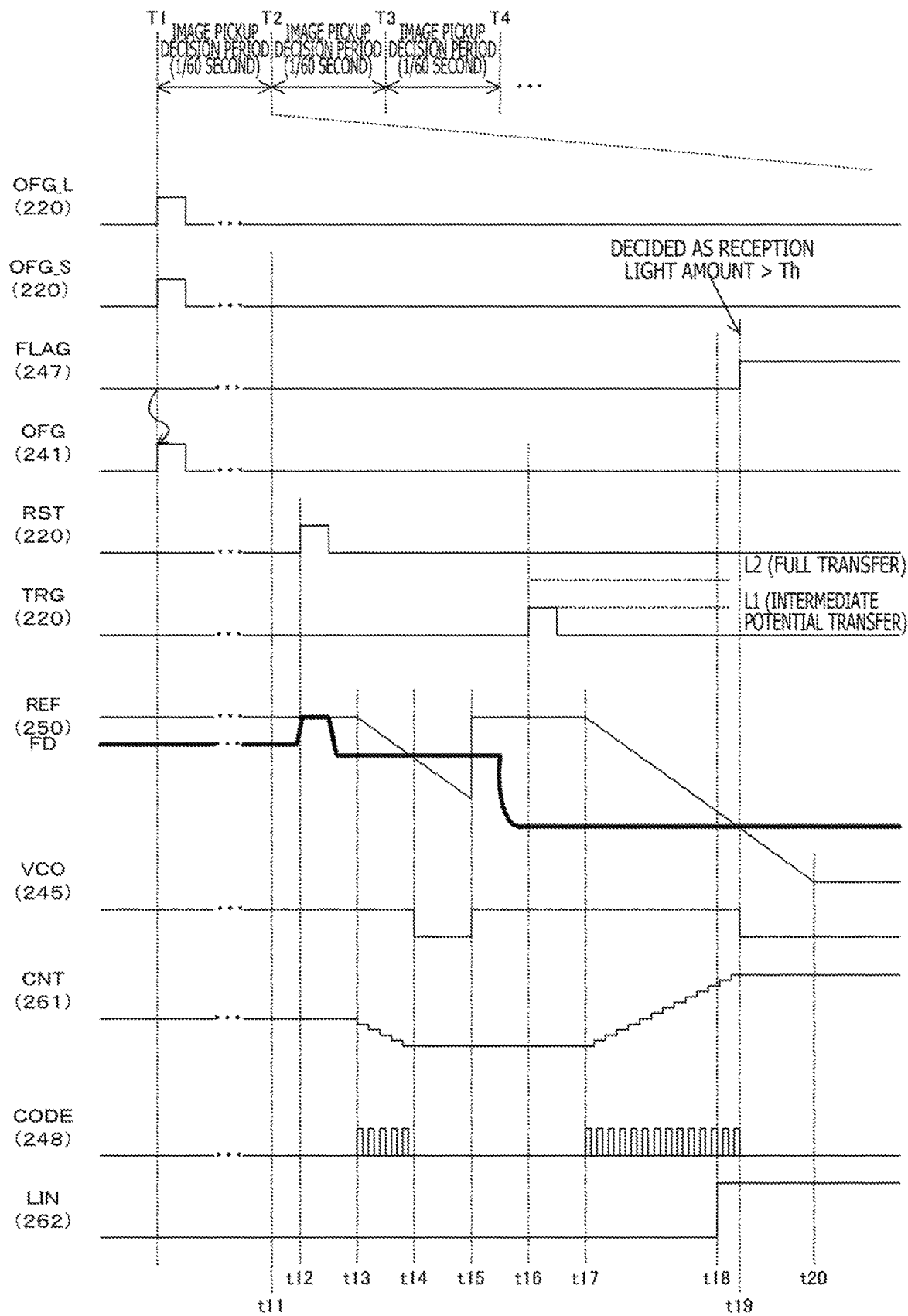
FIG. 28 is a timing chart depicting an example of operation till intermediate potential transfer of a pixel circuit whose reception light amount is great in the fifth embodiment of the present technology.

FIG. 28 is a timing chart depicting an example of operation till intermediate potential transfer of the pixel circuit 240 where the reception light amount is great in the fifth embodiment. First at timing T1, the control signals OFG_L and OFG_S are controlled to the high level over a same pulse period. Then, within a period from timing t12 to timing t15, the reset level is counted. At timing t16 after then, a transfer signal TRG of a middle level L1 is supplied, and the transfer transistor 420 performs intermediate potential transfer. Within a period after timing t17 to timing t19, a count value CNT indicative of the difference between the reset level and the signal level is counted. Since the count value CNT exceeds the set value (namely, since the reception light amount exceeds the predetermined value Th), a decision flag FLAG of the high level is generated.

Figure 29:
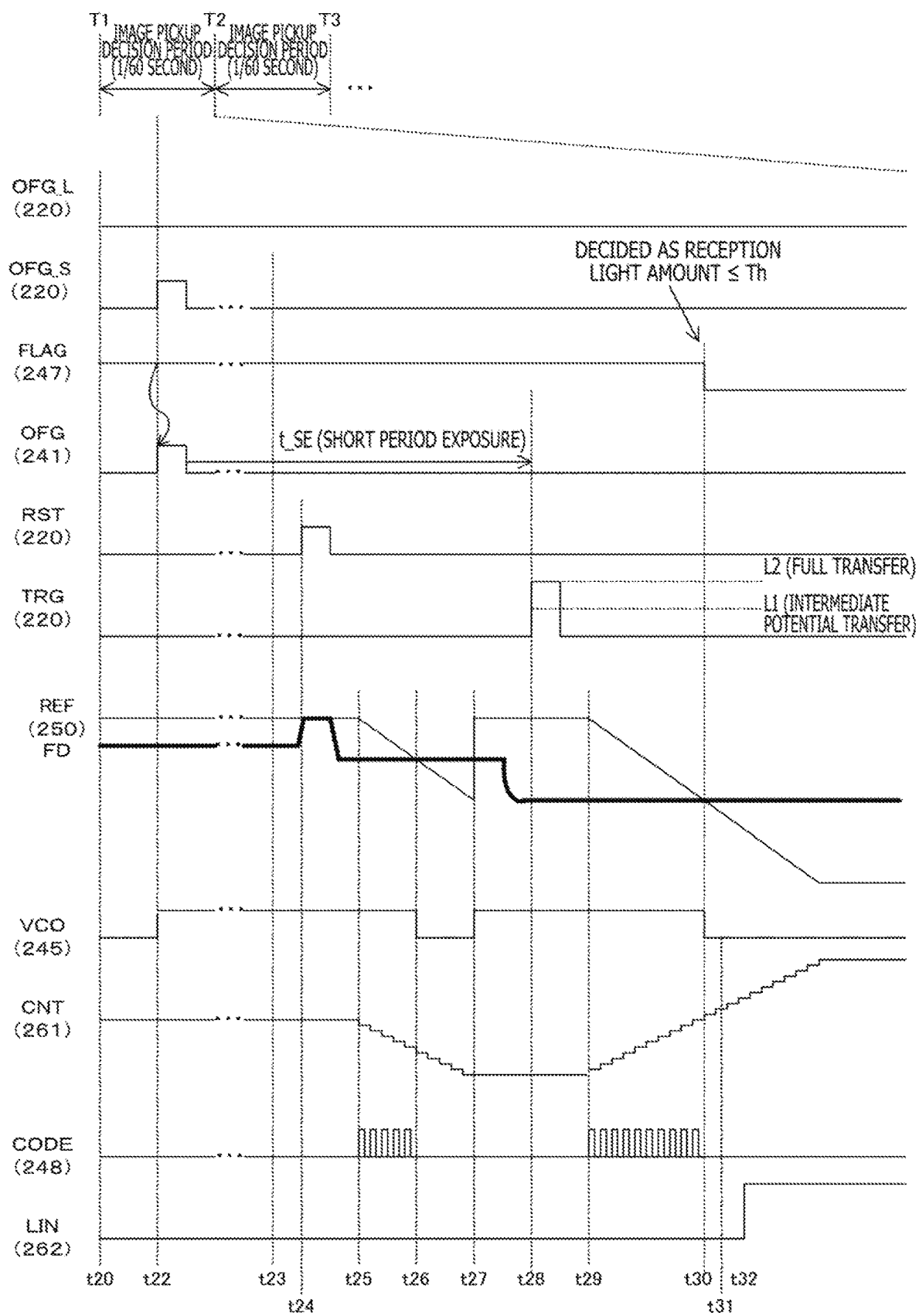
FIG. 29 is a timing chart depicting an example of operation till full transfer of the pixel circuit whose reception light amount is great in the fifth embodiment of the present technology.

FIG. 29 is a timing chart depicting an example of operation till full transfer of the pixel circuit 240 where the reception light amount is great in the fifth embodiment. At timing t22 immediately after the intermediate potential transfer, the control signal OFG_S is controlled to the high level over a predetermined pulse period. Meanwhile, the control signal OFG_L remains having the low level. Further, the switch 241 selects the control signal OFG_S in accordance with the decision flag FLAG of the high level and outputs the control signal OFG_S as OFG. Consequently, short period exposure for the exposure period t_SE is started.

Then, within a period from timing t24 to timing t27, the reset level is counted. At timing t28 after then, a transfer signal TRG of a high level L2 is supplied, and the transfer transistor 420 performs full transfer. The short period exposure ends therewith. Within a period from timing t29 to timing t30, a count value CNT indicative of the difference between the reset level and the signal level is counted. This count value CNT indicates a pixel value of the pixel for which the short period exposure is performed.

Figure 30:
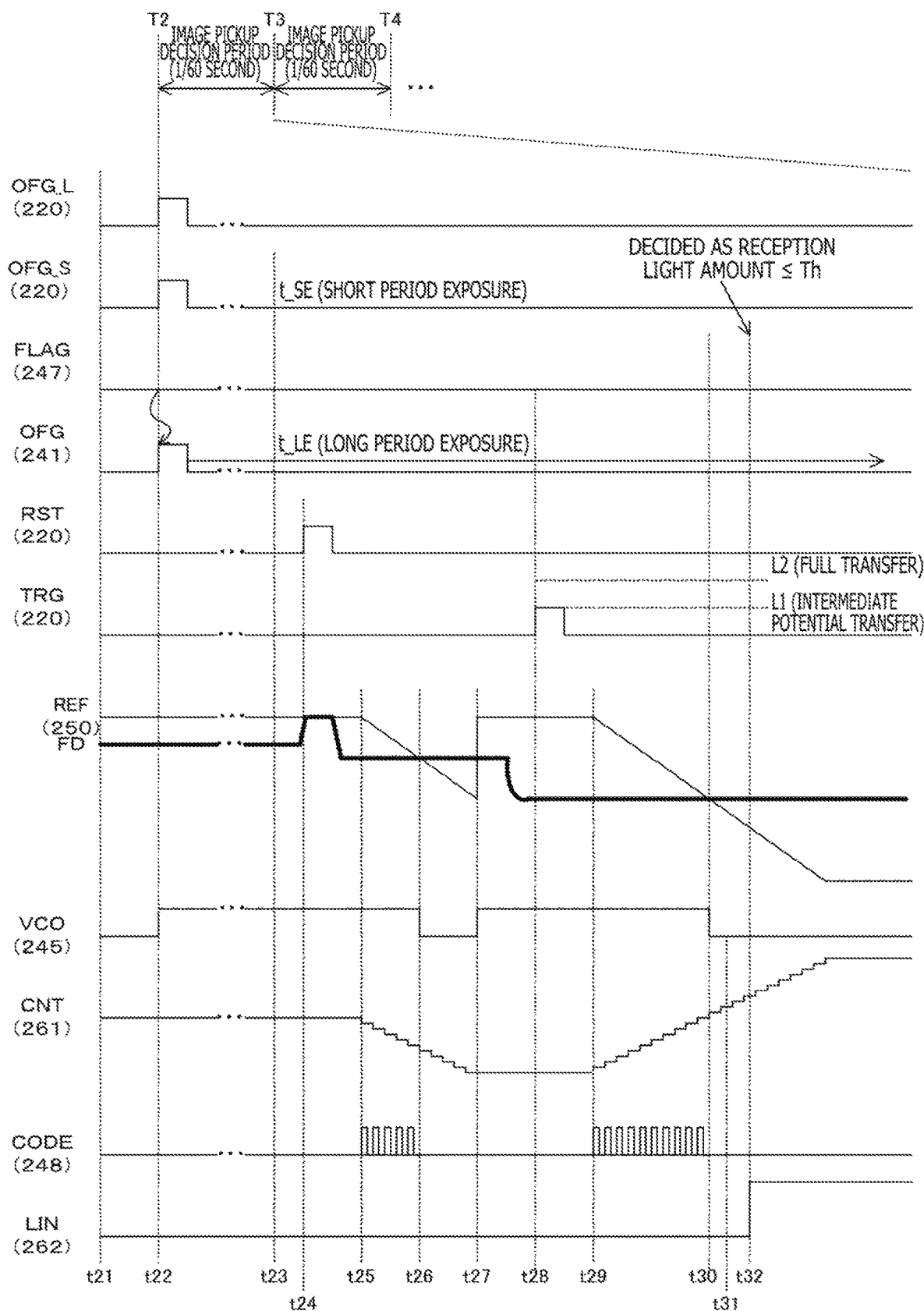
FIG. 30 is a timing chart depicting an example of operation till intermediate potential transfer of a pixel circuit whose reception light amount is small in the fifth embodiment of the present technology.

FIG. 30 is a timing chart indicative of an example of operation till intermediate potential transfer of the pixel circuit 240 where the reception light amount is small in the fifth embodiment. Since the control signals OFG_S and OFG_L are same at timing T2, the switch 241 outputs a control signal OFG of a fixed pulse width irrespective of the value of the decision flag FLAG. In accordance with the control signal OFG, exposure of the pixel circuit 240 is started.

Then at timing t28, the transfer transistor 420 performs intermediate potential transfer. Within a period from timing t29 to timing t30, a count value CNT indicative of the difference between the reset level and the signal level is counted. Since the count value CNT then is equal to or lower than the set value (namely, since the reception light amount is equal to or smaller than the predetermined value Th), a decision flag FLAG of the low level is generated.

Figure 31:
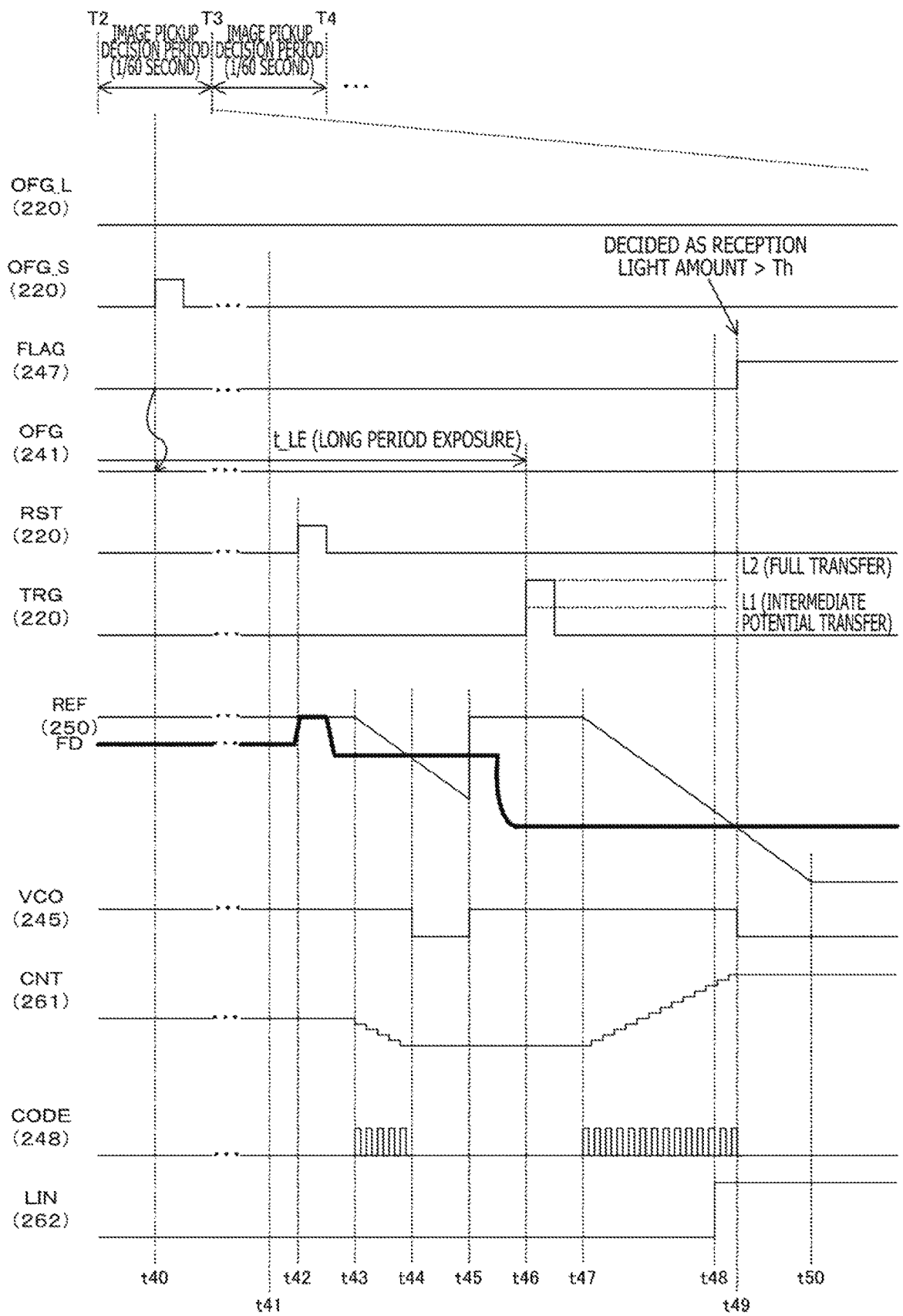
FIG. 31 is a timing chart depicting an example of operation till full transfer of the pixel circuit whose reception light amount is small in the fifth embodiment of the present technology.

FIG. 31 is a timing chart indicative of an example of operation till full transfer of the pixel circuit 240 where the reception light amount is small in the fifth embodiment. At timing t40 immediately after intermediate potential transfer, the switch 241 selects the control signal OFG_L in accordance with the decision flag FLAG of the low level and outputs the control signal OFG_L as OFG. Consequently, upon intermediate potential transfer, a supernatant signal is not reset and accumulation of charge continues, and exposure is performed over the long period of the exposure period t_LE. Then, at timing t46, the transfer signal TRG of the high level L2 is supplied, and the transfer transistor 420 performs full transfer. The long period exposure ends therewith.

In this manner, according to the fifth embodiment of the present technology, since the pixel circuit 240 measures the reception light amount in an image pickup cycle and selects an exposure period in response to a result of the measurement, even in the case where the reception light amount varies by a great amount in comparison with that in the preceding image pickup cycle, exposure can be performed within an appropriate exposure period after the variation. Consequently, the picture quality of image data can be improved.

It is to be noted that the embodiments described above indicate an example for embodying the present technology, and the matters in the embodiments and specific matters of the invention in the claims individually have corresponding relationships. Similarly, the specific matters of the invention in the claims and matters in the embodiments of the present invention to which same names as those in the claims are applied individually have corresponding relationships. However, the present technology is not restricted to the embodiments and can be embodied by applying various modifications to the embodiments without departing from the subject matter of the present technology.

Further, the processing procedures described in the foregoing description of the embodiments may be grasped as a method having such a series of procedures or may be grasped as a program for causing a computer to execute such a series of procedures or a recording medium that stores the program. As this recording medium, for example, a CD (Compact Disc), an MD (MiniDisc), a DVD (Digital Versatile Disc), a memory card, a Blu-ray disc (Blu-ray (registered trade mark) Disc) and so forth can be used.

It is to be noted that the effects described herein are not necessarily restrictive and may be some effects described in the present disclosure.

It is to be noted that the present technology can take the following configuration.

(1)

An image pickup apparatus, including:

a measurement section configured to measure a reception light amount in each of a plurality of regions to generate a measurement result;

a selection section configured to select one of a plurality of exposure periods different from each other based on the measurement result in each of the plurality of regions;

a digital signal generation section configured to perform exposure for each of the plurality of regions over the selected exposure period to generate a digital signal; and an image processing section configured to adjust a value of the digital signal generated for each of the plurality of regions based on the measurement result.

(2)

The image pickup apparatus according to (1), in which each of the plurality of regions is configured from one pixel.

(3)

The image pickup apparatus according to (1), in which each of the plurality of regions is configured from a plurality of pixels.

(4)

The image pickup apparatus according to any one of (1) to (3), in which the measurement section decides whether or not the reception light amount is higher than a given value and generates and retains a decision flag indicative of a result of the decision as the measurement result.

(5)

The image pickup apparatus according to (4), further including:

a counting section configured to count a count value in synchronism with a given clock signal;

a photodiode configured to generate charge according to the reception light amount; and a comparator configured to compare a given ramp signal and a voltage according to an amount of the charge with each other and output a result of the comparison as a comparator output signal, in which the digital signal generation section retains, in the case where the comparator output signal is inverted, the count value as the digital signal, and the measurement section includes a decision flag generation section configured to compare the count value and a given set value according to the given value with each other and output a result of the comparison as a latch input signal, and a decision flag retention section configured to retain, in the case where the comparator output signal is inverted, a value of the latch input signal as the decision flag.

(6)

The image pickup apparatus according to (5), in which the counting section first performs one of an incrementing process and a decrementing process of the count value and then performs an other of the processes.

(7)

The image pickup apparatus according to (5), in which the image processing section executes at least one of a process of amplifying the digital signal in any region in which the reception light amount is higher than the given value from among the plurality of regions and another process of attenuating the digital signal in any region in which the reception light amount does not exceed the given value from among the plurality of regions.

(8)

The image pickup apparatus according to any one of (1) to (7), in which the measurement section retains the measurement result every time a given image pickup cycle elapses, and the selection section selects, in each of the given image pickup cycles, one of the plurality of exposure periods based on the measurement result retained before the image pickup cycle.

(9)

The image pickup apparatus according to any one of (1) to (7), in which
the selection section selects, in each of the given image pickup cycles, one of the plurality of exposure periods based on the measurement result generated in the image pickup cycle.

(10)

The image pickup apparatus according to any one of (1) to (9), in which
the measurement section, the selection section and the digital signal generation section are provided in a solid-state image pickup device, and
a circuit in the solid-state image pickup device is distributed to a plurality of stacked semiconductor substrates.

(11)

A solid-state image pickup device, including:
a measurement section configured to measure a reception light amount in each of a plurality of regions to generate a measurement result;
a selection section configured to select one of a plurality of exposure periods different from each other based on the measurement result in each of the plurality of regions; and
a digital signal generation section configured to perform exposure for each of the plurality of regions over the selected exposure period to generate a digital signal indicative of an exposure light amount.

(12)

A control method for an image pickup apparatus, including:
a measurement procedure for measuring a reception light amount in each of a plurality of regions to generate a measurement result;
a selection procedure for selecting one of a plurality of exposure periods different from each other based on the measurement result in each of the plurality of regions;
a digital signal generation procedure for performing exposure for each of the plurality of regions over the selected exposure period to generate a digital signal indicative of an exposure light amount; and
an image processing procedure for adjusting a value of the digital signal generated for each of the plurality of regions based on the measurement result.

REFERENCE SIGNS LIST

100 Image pickup apparatus
110 Image pickup lens
120 Image processing section
121 Correlated double sampling circuit
122, 241, 361, 381 Switch
123 Multiplier
124 Latter stage processing section
130 Image pickup controlling section
140 Recording section
200 Solid-state image pickup device
201 Upper side semiconductor substrate
202 Lower side semiconductor substrate
210 Interface
220 Driver
230 Pixel array section
240, 360, 380, 390 Pixel circuit
242, 362, 382 PD reset transistor
243, 363, 383 Photodiode
244, 364, 384, 420 Transfer transistor
245, 365, 385 Comparator
246, 366, 386 FD reset transistor
247, 367 Decision flag retention section
248 Digital signal retention section
250 Ramp signal generation section
260 Counting section
261 Up counter
262, 301, 368 Decision flag generation section
270 Timing generation section
302, 370, 389 Up-down counter
350 Light reception region
369, 388 Adder
410 Latch circuit

What is claimed is:

1. An image pickup apparatus, comprising:
a measurement section configured to measure a reception light amount in each of a plurality of regions to generate a measurement result, wherein the measurement section decides whether or not the reception light amount is higher than a given value and generates and retains a decision flag indicative of a result of the decision as the measurement result,
a selection section configured to select one of a plurality of exposure periods different from each other based on the measurement result in each of the plurality of regions;
a digital signal generation section configured to perform exposure for each of the plurality of regions over the selected exposure period to generate a digital signal,
an image processing section configured to adjust a value of the digital signal generated for each of the plurality of regions based on the measurement result;
a counting section configured to count a count value in synchronism with a given clock signal;
a photodiode configured to generate charge according to the reception light amount; and
a comparator configured to compare a given ramp signal and a voltage according to an amount of the charge with each other and output a result of the comparison as a comparator output signal,
wherein the digital signal generation section retains, in a case where the comparator output signal is inverted, the count value as the digital signal, and
wherein the measurement section includes
a decision flag generation section configured to compare the count value and a given set value according to the given value with each other and output a result of the comparison as a latch input signal, and
a decision flag retention section configured to retain, in the case where the comparator output signal is inverted, a value of the latch input signal as the decision flag.

2. The image pickup apparatus according to claim 1, wherein
each of the plurality of regions is configured from one pixel.

3. The image pickup apparatus according to claim 1, wherein
each of the plurality of regions is configured from a plurality of pixels.

4. The image pickup apparatus according to claim 1, wherein
the counting section first performs one of an incrementing process and a decrementing process of the count value and then performs an another of the processes.

5. The image pickup apparatus according to claim 1, wherein
the image processing section executes at least one of a process of amplifying the digital signal in any region in which the reception light amount is higher than the given value from among the plurality of regions and another process of attenuating the digital signal in any region in which the reception light amount does not exceed the given value from among the plurality of regions.

6. The image pickup apparatus according to claim 1, wherein
for each of a plurality of given image pickup cycles, the measurement section retains the measurement result every time a given image pickup cycle elapses, and
the selection section selects, in each of the given image pickup cycles, one of the plurality of exposure periods based on the measurement result retained before the image pickup cycle.

7. The image pickup apparatus according to claim 1, wherein
the selection section selects, in each of a plurality of given image pickup cycles, one of the plurality of exposure periods based on the measurement result generated in the given image pickup cycle.

8. The image pickup apparatus according to claim 1, wherein
the measurement section, the selection section and the digital signal generation section are provided in a solid-state image pickup device, and
a circuit in the solid-state image pickup device is distributed to a plurality of stacked semiconductor substrates.

9. A solid-state image pickup device, comprising:
a measurement section configured to measure a reception light amount in each of a plurality of regions to generate a measurement result, wherein the measurement section decides whether or not the reception light amount is higher than a given value and generates and retains a decision flag indicative of a result of the decision as the measurement result;
a selection section configured to select one of a plurality of exposure periods different from each other based on the measurement result in each of the plurality of regions;
a digital signal generation section configured to perform exposure for each of the plurality of regions over the selected exposure period to generate a digital signal indicative of an exposure light amount;
a counting section configured to count a count value in synchronism with a given clock signal;
a photodiode configured to generate charge according to the reception light amount; and
a comparator configured to compare a given ramp signal and a voltage according to an amount of the charge with each other and output a result of the comparison as a comparator output signal,
wherein the digital signal generation section retains, in a case where the comparator output signal is inverted, the count value as the digital signal, and
wherein the measurement section includes
a decision flag generation section configured to compare the count, value and a given set value according to the given value with each other and output a result of the comparison as a latch input signal, and
a decision flag retention section configured to retain, in the case where the comparator output signal is inverted a value of the latch input signal as the decision flag.

10. A control method for an image pickup apparatus, comprising:
a measurement procedure for measuring a reception light amount in each of a plurality of regions to generate a measurement result, wherein the measurement procedure includes deciding whether or not the reception light amount is higher than a given value and generating and retaining a decision flag indicative of a result of the decision as the measurement result;
a selection procedure for selecting one of a plurality of exposure periods different from each other based on the measurement result in each of the plurality of regions;
a digital signal generation procedure for performing exposure for each of the plurality of regions over the selected exposure period to generate a digital signal indicative of an exposure light amount;
an image processing procedure for adjusting a value of the digital signal generated for each of the plurality of regions based on the measurement result;
a counting procedure that one of increments or decrements a count value in synchronism with a given clock signal;
a charge generation procedure, wherein a photodiode generates charge according to the reception light amount; and
a comparison procedure, wherein a given ramp signal and a voltage are compared with each other according to an amount of the charge and a result of the comparison is provided as a comparator output signal,
wherein the digital signal generation procedure retains, in a case where the comparator output signal is inverted, the count value as the digital signal, and
wherein the measurement procedure includes
a decision flag generation procedure that compares the count value and a given set value according to the given value with each other and outputs a result of the comparison as a latch input signal, and
a decision flag retention procedure that retains, in the case where the comparator output signal is inverted, a value of the latch input signal as the decision flag.

* * * * *